(12) United States Patent
Inagaki et al.

(10) Patent No.: US 6,821,677 B2
(45) Date of Patent: Nov. 23, 2004

(54) NEGATIVE ELECTRODE ACTIVE MATERIAL AND NONAQUEOUS ELECTROLYTE BATTERY

(75) Inventors: Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 287 days.

(21) Appl. No.: 10/108,435

(22) Filed: Mar. 29, 2002

(65) Prior Publication Data

US 2003/0049541 A1 Mar. 13, 2003

(30) Foreign Application Priority Data

| Mar. 29, 2001 | (JP) | ................................. 2001-095027 |
| Mar. 29, 2001 | (JP) | ................................. 2001-095029 |
| Jun. 29, 2001 | (JP) | ................................. 2001-198088 |

(51) Int. Cl.[7] ..................... H01M 4/58; H01M 10/40; C01B 25/14
(52) U.S. Cl. ..................... 429/221; 429/332; 423/303; 423/511
(58) Field of Search ..................... 429/221, 332; 423/303, 511

(56) References Cited

U.S. PATENT DOCUMENTS

| 4,049,879 | A | * | 9/1977 | Thompson et al. | ......... 429/221 |
| 5,994,000 | A | * | 11/1999 | Ein-Eli et al. | ............... 429/332 |
| 6,207,327 | B1 | | 3/2001 | Takada et al. | ............... 429/304 |
| 6,300,009 | B1 | * | 10/2001 | Yoshida et al. | ............. 429/221 |
| 6,350,542 | B1 | * | 2/2002 | Gan et al. | .................... 429/332 |
| 6,541,162 | B1 | * | 4/2003 | Song et al. | .................. 429/332 |
| 2002/0142219 | A1 | * | 10/2002 | Takada et al. | ............... 429/221 |

FOREIGN PATENT DOCUMENTS

| JP | 7-211352 | * | 8/1995 | .......... H01M/10/40 |
| JP | 8-106909 | * | 4/1996 | .......... H01M/10/40 |
| JP | 10-199544 | * | 7/1998 | ............ H01M/4/58 |
| JP | 11-297358 | | 10/1999 | |

OTHER PUBLICATIONS

English Translation of JP 11–297,358 (Takada et al.), dated Oct. 1999, from Japanese Patent Office.*
Kazunori Takada, et al., "Lithium Iron Sulfide as an Electrode Material in a Solid State Lithium Battery", Solid State Ionics 117 (1999) pp. 273–276, month unknown.

* cited by examiner

Primary Examiner—Stephen J. Kalafut
(74) Attorney, Agent, or Firm—Oblon, Spivak, McClelland, Maier & Neustadt, P.C.

(57) ABSTRACT

A nonaqueous electrolyte battery includes a positive electrode containing a positive electrode active material, a negative electrode containing a sulfide containing Fe, and a nonaqueous electrolyte including a nonaqueous solvent and a solute dissolved in the nonaqueous solvent, the nonaqueous solvent containing a first solvent containing a cyclic carbonate and a second solvent containing a chain carbonate, wherein the content of the first solvent in the nonaqueous solvent falls within a range of between 4.8 and 29% by volume and the content of the second solvent in the nonaqueous solvent falls within a range of between 71 and 95.2% by volume.

23 Claims, 4 Drawing Sheets

NEGATIVE ELECTRODE ACTIVE MATERIAL AND NONAQUEOUS ELECTROLYTE BATTERY

CROSS-REFERENCE TO RELATED APPLICATIONS

This application is based upon and claims the benefit of priority from the prior Japanese Patent Applications No. 2001-095027, filed Mar. 29, 2001, No. 2001-095029, field Mar. 29, 2001; and No. 2001-198088, filed Jun. 29, 2001, the entire contents of all of which are incorporated herein by reference.

BACKGROUND OF THE INVENTION

1. Field of the Invention

The present invention relates to a negative electrode active material and a nonaqueous electrolyte battery.

2. Description of the Related Art

Nowadays, a lithium secondary battery has been commercialized as a nonaqueous electrolyte secondary battery for a portable equipment such as a portable telephone. The lithium secondary battery comprises a positive electrode containing a lithium cobalt oxide such as $LiCoO_2$ as a positive electrode active material, a negative electrode containing a carbonaceous material as a negative electrode active material, and a nonaqueous electrolyte prepared by dissolving a lithium salt in an organic solvent.

In recent years, the power consumption of a portable equipment is being increased in accordance with increase in the number of required functions and with elevation in the required performance of the equipment. In this connection, demands for a larger capacity are being made stronger in respect of the battery providing the power source of the portable equipment. Under the circumstances, efforts to develop new electrode materials that are expected to increase the battery capacity are being made vigorously.

Known metal sulfides used as the negative electrode active material in a nonaqueous electrolyte battery include, for example, $FeS_2$, $CuS$ and $NiS$. Particularly, $FeS_2$, which performs a four-electron reaction and has such a high theoretical capacity as about 894 mAh/g, is a hopeful metal sulfide.

However, the Fe-containing sulfide such as $FeS_2$ is low in reversibility of the reaction taking place in the charge-discharge time. As a result, the secondary battery comprising an Fe-containing sulfide as a negative electrode active material gives rise to the problem that the cycle life is short. Particularly, the decrease of the cycle life was serious in the case of using a liquid material as the nonaqueous electrolyte.

BRIEF SUMMARY OF THE INVENTION

An object of the present invention is to provide a nonaqueous electrolyte battery exhibiting an improved cycle life, and to provide a negative electrode active material capable of exhibiting an improved cycle life.

Another object of the present invention is to provide a nonaqueous electrolyte battery exhibiting an improved energy density, and to provide a negative electrode active material capable of exhibiting an improved energy density.

According to a first aspect of the present invention, there is provided a nonaqueous electrolyte battery, comprising:

a positive electrode containing a positive electrode active material;

a negative electrode containing a sulfide containing Fe; and a nonaqueous electrolyte including a nonaqueous solvent and a solute dissolved in the nonaqueous solvent, the nonaqueous solvent containing a first solvent containing a cyclic carbonate and a second solvent containing a chain carbonate;

wherein the content of the first solvent in the nonaqueous solvent falls within a range of between 4.8 and 29% by volume and the content of the second solvent in the nonaqueous solvent falls within a range of between 71 and 95.2% by volume.

According to a second aspect of the present invention, there is provided a nonaqueous electrolyte battery, comprising:

a positive electrode containing a positive electrode active material;

a negative electrode containing a sulfide containing Fe; and a nonaqueous electrolyte including a nonaqueous solvent, the nonaqueous solvent comprising a first solvent containing a cyclic carbonate and a second solvent containing a chain carbonate, and a solute dissolved in the nonaqueous solvent, the mixing ratio of the first solvent and the second solvent satisfying formula (1):

$$S_1:S_2 = 1:2.5 \text{ to } 1:20 \tag{1}$$

where $S_1$ represents the volume ratio of the first solvent, and $S_2$ represents the volume ratio of the second solvent.

According to a third aspect of the present invention, there is provided a negative electrode active material capable of absorbing-desorbing an alkali metal, the negative electrode active material containing a compound having a composition represented by formula (4):

$$A_zFe_{(1-x)}M_xS_y \tag{4}$$

where "A" contains at least one kind of an alkali metal, "M" contains at least one element selected from the group consisting of Cu, Ni, Co, Mn, Mg, Al, Si and Cr, the molar ratio x falls within a range of between 0.0003 and 0.03, i.e., $0.0003 \leq x \leq 0.03$, the molar ratio y falls within a range of between 1.08 and 1.33, i.e., $1.08 \leq y \leq 1.33$, and the molar ratio z is not higher than 2, i.e., $0 \leq z \leq 2$.

According to a fourth aspect of the present invention, there is provided a nonaqueous electrolyte battery, comprising:

a positive electrode;

a negative electrode containing a negative electrode active material capable of absorbing-desorbing an alkali metal; and a nonaqueous electrolyte;

wherein the negative electrode active material contains a compound having a composition represented by formula (4):

$$A_zFe_{(1-x)}M_xS_y \tag{4}$$

where "A" contains at least one kind of an alkali metal, "M" contains at least one element selected from the group consisting of Cu, Ni, Co, Mn, Mg, Al, Si and Cr, the molar ratio x falls within a range of between 0.0003 and 0.03, i.e., $0.0003 \leq x \leq 0.03$, the molar ratio y falls within a range of between 1.08 and 1.33, i.e., $1.08 \leq y \leq 1.33$, and the molar ratio z is not higher than 2, i.e., $0 \leq z \leq 2$.

According to a fifth aspect of the present invention, there is provided a negative electrode active material capable of absorbing-desorbing an alkali metal, the negative electrode active material containing a sulfide containing P and at least one kind of a metal element selected from the group consisting of Fe, Ni, Co, Mn and Cu.

According to a sixth aspect of the present invention, there is provided a negative electrode active material capable of absorbing-desorbing an alkali metal, the negative electrode active material containing a compound having a composition represented by formula (5):

$$A_a M1 P_b S_c \tag{5}$$

where "A" includes at least one kind of an alkali metal element, "M1" includes at least one kind of an element selected from the group consisting of Fe, Ni, Co, Mn and Cu, the molar ratio "a" falls within a range of between 0 and 12, i.e., $0 \leq a \leq 12$, the molar ratio "b" falls within a range of between 0.1 and 1.1, i.e., $0.1 \leq b \leq 1.1$, and the molar ratio "c" falls within a range of between 0.9 and 3.3, i.e., $0.9 \leq c \leq 3.3$.

According to a seventh aspect of the present invention, there is provided a nonaqueous electrolyte battery, comprising:

a positive electrode;
a negative electrode containing a negative electrode active material capable of absorbing-desorbing an alkali metal; and
a nonaqueous electrolyte;
wherein the negative electrode active material contains a sulfide containing P and at least one metal element selected from the group consisting of Fe, Ni, Co, Mn and Cu.

According to an eighth aspect of the present invention, there is provided a nonaqueous electrolyte battery, comprising:

a positive electrode;
a negative electrode containing a negative electrode active material capable of absorbing-desorbing an alkali metal; and
a nonaqueous electrolyte;
wherein the negative electrode active material contains a compound having a composition represented by formula (5):

$$A_a M1 P_b S_c \tag{5}$$

where "A" includes at least one kind of an alkali metal element, "M1" includes at least one kind of an element selected from the group consisting of Fe, Ni, Co, Mn and Cu, the molar ratio "a" falls within a range of between 0 and 12, i.e., $0 \leq a \leq 12$, the molar ratio "b" falls within a range of between 0.1 and 1.1, i.e., $0.1 \leq b \leq 1.1$, and the molar ratio "c" falls within a range of between 0.9 and 3.3, i.e., $0.9 \leq c \leq 3.3$.

DETAILED DESCRIPTION OF THE INVENTION

Figure 1:
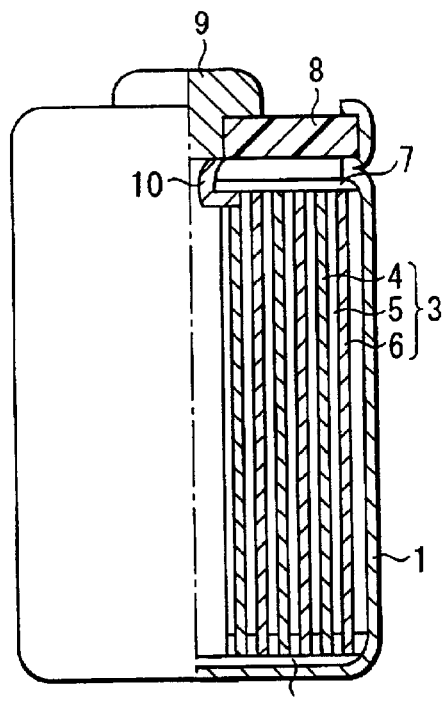
FIG. 1 is a partial cross sectional view showing the construction of a cylindrical nonaqueous electrolyte battery according to one embodiment of the present invention.

First to third nonaqueous electrolyte batteries according to the present invention will now be described.

The first nonaqueous electrolyte battery of the present invention comprises a case, an electrode group housed in the case and including a positive electrode and a negative electrode, and a nonaqueous electrolyte held by the electrode group. An Fe-containing sulfide is contained in the negative electrode. The nonaqueous electrolyte comprises a nonaqueous solvent and a solute dissolved in the nonaqueous solvent. Further, the nonaqueous solvent comprises a first solvent containing a cyclic carbonate and a second solvent containing a chain carbonate. The content of the first solvent in the nonaqueous solvent falls within a range of between 4.8 and 29% by volume, the content of the second solvent in the nonaqueous solvent falls within a range of between 71 and 95.2% by volume.

It is possible to arrange a separator between the positive electrode and the negative electrode in the nonaqueous electrolyte battery of the present invention. It is also possible to arrange a gel-like nonaqueous electrolyte layer in place of the separator between the positive electrode and the negative electrode.

The positive electrode, the negative electrode, the separator, the nonaqueous electrolyte and the case included in the nonaqueous electrolyte battery of the present invention will now be described in the following.

(1) Positive Electrode

The positive electrode contains a positive electrode active material.

The positive electrode can be prepared by, for example, suspending a positive electrode active material, a conductive agent and a binder in a suitable solvent so as to prepare a suspension, followed by coating a current collector such as an aluminum foil with the resultant suspension and subsequently drying and, then, pressing the current collector coated with the suspension.

Various oxides can be used in the present invention as the positive electrode active material. Specifically, the oxides used in the present invention as the positive electrode active material include, for example, manganese dioxide, e.g., $MnO_2$; lithium manganese complex oxides such as $LiMn_2O_4$ and $LiMnO_2$; lithium nickel complex oxides such as $LiNiO_2$; lithium cobalt complex oxides such as $LiCoO_2$; lithium nickel cobalt complex oxides such as $LiNi_{1-x}Co_xO_2$;

lithium manganese cobalt complex oxides such as $LiMn_xCo_{2-x}O_4$; lithium nickel cobalt aluminum complex oxides such as $LiNi_{1-x-y}Co_xAl_yO_2$; lithium manganese nickel complex oxides such as $LiMn_xNi_{2-x}O_4$; lithium manganese cobalt nickel complex oxides such as $LiMn_xCo_{2-x-y}Ni_yO_4$; and vanadium oxides such as $V_2O_5$. It is also possible to use as the positive electrode active material organic materials such as a conductive polymer material and a disulfide series polymer material.

It is possible to use as the positive electrode active material one kind of the oxide or the organic material, a mixture of at least two kinds of the oxides, or a mixture of the oxide and the organic material.

Among the oxides exemplified above, it is desirable to use as the positive electrode active material lithium manganese complex oxides such as $LiMn_2O_4$; lithium nickel complex oxides such as $LiNiO_2$; lithium cobalt complex oxides such as $LiCoO_2$; lithium nickel cobalt complex oxides such as $LiNi_{1-x}Co_xO_2$; lithium nickel cobalt aluminum complex oxides such as $LiNi_{1-x-y}Co_xAl_yO_2$; lithium manganese cobalt complex oxides such as $LiMn_xCo_{2-x}O_4$; lithium manganese nickel complex oxides such as $LiMn_xNi_{2-x}O_4$; and lithium manganese cobalt nickel oxides such as $LiMn_xCo_{2-x-y}Ni_yO_4$ because these complex oxides permit achieving a high battery voltage.

It is particularly desirable to use the oxides having a composition represented by formula (3) given below:

$$Li_{(1+s)}Ni_{(1-t-u)}Co_tT_uO_2 \qquad (3)$$

where T represents at least one kind of an element selected from the group consisting of the transition metal elements other than Ni and Co, the molar ratio s falls within a range of between 0 and 0.2, i.e., $0 \leq s \leq 0.2$, the molar ratio t falls within a range of between 0.1 and 0.4, i.e., $0.1 \leq t \leq 0.4$, and the molar ratio u falls within a range of between 0.01 and 0.2, i.e., $0.01 \leq u \leq 0.2$.

In the case of using the oxide having a composition represented by formula (3) given above, it is possible to achieve a high discharge capacity and a long cycle life even when the battery is rapidly charged.

To be more specific, in the secondary battery comprising a positive electrode containing a positive electrode active material containing an oxide having a composition represented by formula (3) given above, the lithium absorption potential of the positive electrode is on the base side, compared with the secondary battery in which a lithium cobalt oxide alone is used as the positive electrode active material. It follows that it is possible to increase the potential difference between the positive electrode potential changing from the charging under a constant current to the charging under a constant voltage and the lithium absorption potential, with the result that it is possible to carry out the charging with a high rate under a constant current for a long time. This makes it possible to obtain a sufficiently charged capacity in a short charging time, thereby achieving a high discharge capacity and a long cycle life even when the battery is charged rapidly.

The molar ratios s, t and u in the composition represented by formula (3) given above are set in the present invention such that the molar ratio s falls within a range of between 0 and 0.2, i.e., $0 \leq s \leq 0.2$, the molar ratio t falls within a range of between 0.1 and 0.4, i.e., $0.1 \leq t \leq 0.4$, and the molar ratio u falls within a range of between 0.01 and 0.2, i.e., $0.01 \leq u \leq 0.2$, as described above. The reasons for the molar ratios thus set are as follows.

(Molar Ratio s)

It is desirable for the molar ratio s in formula (3) to fall within a range of between 0 and 0.2, i.e., $0 \leq s \leq 0.2$. If the molar ratio s is smaller than 0, the Li site of the oxide represented by formula (3) is replaced by another element such as Ni, with the result that the battery capacity tends to be substantially lowered. On the other hand, if the molar ratio s is larger than 0.2, the initial irreversible capacity is increased so as to make it possible to lower the Coulomb efficiency. It is also possible for the alkali component remaining in the oxide represented by formula (3) to induce a gas generation in the charging time. It is more desirable for the molar ratio s to fall within a range of between 0 and 0.1, i.e., $0 \leq s \leq 0.1$.

(Molar Ratio t)

It is desirable for the molar ratio t to fall within a range of between 0.1 and 0.4, i.e., $0.1 \leq t \leq 0.4$. If the molar ratio t is smaller than 0.1, the thermal stability of the oxide represented by formula (3) tends to be lowered in the charging step. On the other hand, if the molar ratio t is larger than 0.4, it is possible for the capacity of the active material represented by formula (3) to be lowered. It is more desirable for the molar ratio t to fall within a range of between 0.25 and 0.35, i.e., $0.25 \leq t \leq 0.35$.

(Molar Ratio u)

It is desirable for the molar ratio u to fall within a range of between 0.01 and 0.2, i.e., $0.01 \leq u \leq 0.2$. If the molar ratio u is smaller than 0.01, it is possible for the thermal stability of the oxide represented by formula (3) to be lowered. On the other hand, if the molar ratio u is larger than 0.2, it is possible for the capacity of the active material represented by formula (3) to be lowered. It is more desirable for the molar ratio u to fall within a range of between 0.05 and 0.15, i.e., $0.05 \leq u \leq 0.15$.

The element T contained in the oxide represented by formula (3) includes, for example, Al, Nb, Mn, B, Mg, Ca, Sr, Ba, Ti, V, Cr, Fe, Cu, In, Si, Mo, W, Y and Rh. In view of improving the thermal stability and the charge-discharge characteristics of the battery, it is desirable to use Mn, Al or a combination of Mn and Al as the element T.

It is desirable for the oxide represented by formula (3) to exhibit a pH value falling within a range of between 10.5 and 12. If the pH value of the oxide is smaller than 10.5, it is possible to fail to ensure a sufficient capacity in, particularly, the rapid charging operation. On the other hand, if the pH value of the oxide exceeds 12, the lithium absorption potential of the positive electrode is shifted toward the noble side so as to decrease the difference between the positive electrode potential changing from the charging under a constant current to the charging under a constant voltage and the lithium absorption potential. As a result, in the rapid charging operation, i.e., in the charging under a large current, a predetermined positive electrode potential is reached in a relatively initial stage for the switching from the charging under a constant current to the charging under a constant voltage so as to make it difficult to obtain a large discharge capacity in a short charging time. It is more desirable for the pH value to fall within a range of between 10.7 and 11.5.

It is possible to employ, for example, an active material synthetic method described below for controlling the pH value of the oxide represented by formula (3) given previously to fall within a range of between 10.5 and 12.

In the first step, prepared are hydroxides, carbonates or oxides of the elements constituting the oxide of formula (3), e.g., Ni, Co, Mn and Al, as well as hydroxide or carbonate of lithium. These compounds are mixed at a ratio corresponding to the composition of the oxide of formula (3), followed by calcining the resultant mixture at 400 to 900° C. for several to scores of hours under an oxygen stream. The calcined material is pulverized, followed by performing again the calcining under the same conditions. It is possible to control the pH value of the oxide of formula (3) to fall within a range of between 10.5 and 12 by repeating the pulverization and re-calcining steps. It is considered reasonable to understand that the pH value can be controlled to fall within a range of between 10.5 and 12 by the synthetic method because the amount of the lithium salt that is left unreacted within the oxide can be decreased by the repetition of the pulverizing step and the re-calcining step.

The conductive agent used in the present invention includes, for example, acetylene black, carbon black and graphite. On the other hand, the binder used in the present invention includes, for example, polytetrafluoro ethylene (PTFE), polyvinylidene fluoride (PVdF) and fluorine-based rubber.

In order to obtain a nonaqueous electrolyte battery that achieves a good conductivity and a high energy density, it is desirable to control the mixing ratio of the positive electrode active material, the conductive agent and the binder such that the amount of the positive electrode active material falls within a range of between 80 and 95% by weight, the amount of the conductive agent falls within a range of between 3 and 20% by weight, and the amount of the binder falls within a range of between 2 and 7% by weight.

Where the mixing amount of the positive electrode active material is smaller than the lower limit of the range noted, the energy density tends to be lowered. On the other hand, where the mixing amount of the positive electrode active material is larger than the upper limit of the range noted above, the mixing ratio of the conductive agent is lowered so as to tend to be lower the conductivity of the positive electrode.

Also, where the mixing amounts of the conductive agent and the binder are lower than the lower limits of the ranges noted above, it is difficult to obtain a satisfactory conductivity of the positive electrode. On the other hand, where the mixing amounts noted above are larger than the upper limits of the ranges noted above, the mixing ratio of the positive electrode active material is lowered so as to tend to be lower the energy density.

(2) Negative Electrode

The negative electrode contains a negative electrode active material containing a sulfide containing Fe.

The negative electrode can be prepared by, for example, suspending a negative electrode active material, a conductive agent and a binder in a suitable solvent so as to obtain a suspension, followed by coating a current collector with the resultant suspension and subsequently drying and pressing the current collector coated with the suspension.

The Fe-containing sulfide used in the present invention includes, for example, iron sulfide and a complex metal sulfide having a plurality of metal elements consisting of Fe and another metal element. It is possible to use a single or a plurality of kinds of Fe-containing sulfides. It is desirable to use iron sulfides represented by $FeS_x$, where x falls within a range of between 1.08 and 1.33, i.e., $1.08 \leq x \leq 1.33$. Particularly, it is more desirable to use iron sulfides represented by $FeS_x$, where x falls within a range of between 1.08 and 1.2, i.e., $1.08 \leq x \leq 1.2$, because the particular iron sulfides permit increasing both the capacity and the cycle life of the secondary battery. If the molar ratio x of $FeS_x$ is smaller than 1.08, it is difficult to obtain a high discharge capacity of the nonaqueous electrolyte battery. On the other hand, if the molar ratio x exceeds 1.2, the reversibility of the reaction taking place on the negative electrode in the charge-discharge step is markedly lowered. As a result, it is rendered difficult to improve the cycle life of the nonaqueous electrolyte battery even if a nonaqueous electrolyte having a specified composition is used. It is more desirable for the molar ratio x of $FeS_x$ to fall within a range of between 1.09 and 1.12.

The preferred $FeS_x$ includes, for example, $Fe_9S_{10}$ ($FeS_{1.11}$), $Fe_{10}S_{11}$ ($FeS_{1.1}$) and $Fe_{11}S_{12}$ ($FeS_{1.09}$). It is possible to use a single or a plurality of kinds of $FeS_x$.

It is possible for the negative electrode active material to contain a metal or a metal compound other than the Fe-containing sulfide in an amount small enough to prevent the cycle life from being impaired.

The current collector used in the present invention includes, for example, an aluminum foil and a copper foil. In order to decrease the weight of the battery and to improve the weight energy density, it is desirable to use an aluminum foil as the current collector. It is possible for the aluminum foil to contain trace elements such as Si and Mg, which permit improving the mechanical strength and the corrosion resistance of the current collector.

The conductive agent contained in the negative electrode includes, for example, acetylene black, carbon black and graphite. On the other hand, the binder used for preparing the negative electrode includes, for example, polytetrafluoro ethylene (PTFE), polyvinylidene fluoride (PVdF), a fluorine-based rubber, ethylene-butadiene rubber, and carboxy methyl cellulose (CMC).

It is desirable to control the mixing ratios of the negative electrode active material, the conductive agent and the binder noted above such that the amount of the negative electrode active material falls within a range of between 70 and 95% by weight, the amount of the conductive agent falls within a range of between 0 and 25% by weight, and the amount of the binder falls within a range of between 2 and 10% by weight.

(3) Separator

The separator used in the present invention includes, for example, a synthetic resin unwoven fabric, a polyethylene porous film and a polypropylene porous film.

(4) Nonaqueous Electrolyte

The nonaqueous electrolyte used in the present invention includes, for example, a liquid nonaqueous electrolyte, a gel-like nonaqueous electrolyte, and a mixture of a liquid nonaqueous electrolyte and a gel-like nonaqueous electrolyte.

The liquid nonaqueous electrolyte includes, for example, a nonaqueous solvent and a solute dissolved in the nonaqueous solvent. On the other hand, the gel-like nonaqueous electrolyte includes a liquid nonaqueous electrolyte and a polymer material holding the liquid nonaqueous electrolyte.

The nonaqueous solvent, the solute and the polymer material used for preparing the nonaqueous electrolyte used in the present invention will now be described.

(a) Nonaqueous Solvent

The nonaqueous solvent used in the present invention comprises a first solvent containing a cyclic carbonate and a second solvent containing a chain carbonate. The content of the first solvent in the nonaqueous solvent should fall within a range of between 4.8 and 29% by volume. On the other hand, the content of the second solvent in the nonaqueous solvent should fall within a range of between 71 and 95.2% by weight.

It is desirable to use at least one of ethylene carbonate (EC) and propylene carbonate (PC) as the cyclic carbonate. On the other hand, it is desirable to use at least one kind of carbonate selected from the group consisting of dimethyl carbonate (DMC), ethyl methyl carbonate (EMC) and diethyl carbonate (DEC) as the chain carbonate.

If the chain carbonate has a relative dielectric constant of 1 to 3, it is possible to markedly improve the cycle life. Therefore, it is more desirable to use ethyl methyl carbonate (EMC) or diethyl carbonate (DEC) as the chain carbonate. Particularly, it is most desirable to use diethyl carbonate (DEC) as the chain carbonate. It is desirable for the DEC content of the second solvent to be at least 60% by weight, more desirably to be at least 80% by weight.

It is important to control the content of the first solvent and the content of the second solvent in the nonaqueous solvent to fall within the ranges noted above. To be more specific, in a secondary battery containing an Fe-containing sulfide as the positive electrode active material, Fe and $Li_2S$ are generated by the charging. The reaction formula in the case of using FeS as the Fe-containing sulfide is as follows:

$$FeS + 2Li \rightarrow Fe + Li_2S \qquad (I)$$

If the nonaqueous solvent has a high dielectric constant, the solubility of $Li_2S$ in the nonaqueous solvent is increased. As a result, the reversibility of the reaction denoted by reaction formula (I) given above is lowered so as to markedly lower the discharge capacity with progress of the charge-discharge cycles.

If the content of the first solvent in the nonaqueous solvent exceeds 29% by volume, or if the content of the second solvent in the nonaqueous solvent is lower than 71% by volume, the dielectric constant of the nonaqueous solvent is increased, with the result that the reversibility of the charge-discharge reaction of the negative electrode is lowered so as to lower the cycle life of the secondary battery. On the other hand, if the content of the first solvent in the nonaqueous solvent is lower than 4.8% by weight, or the content of the second solvent in the nonaqueous solvent is higher than 95.2% by volume, the electrical conductivity of the nonaqueous electrolyte is lowered so as to lower the discharge characteristics under low temperatures of the secondary battery.

It is more desirable for the content of the first solvent to fall within a range of between 10 and 20% by volume. On the other hand, it is more desirable for the content of the second solvent to fall within a range of between 80 and 90% by volume.

It is desirable for the mixing ratio of the first solvent to the second solvent to satisfy formula (1) given below:

$$S_1:S_2 = 1:2.5 \text{ to } 1:20 \qquad (1)$$

where $S_1$ represents the mixing amount by volume of the first solvent, and $S_2$ represents the mixing amount by volume of the second solvent.

If volume ratio $S_2$, i.e., the mixing amount by volume of the second solvent, is smaller than 2.5, it is possible for the dielectric constant of the nonaqueous electrolyte to be rendered excessively high so as to fail to obtain satisfactory cycle characteristics. On the other hand, if the volume ratio $S_2$ of the second solvent is higher than 20, it is difficult to obtain high discharge characteristics under low temperatures and high discharge characteristics under a large current. It is more desirable for the mixing ratio $S_1:S_2$ of the first solvent to the second solvent to fall within a range of between 1:4 and 1:6. If the mixing ratio falls within the range given above, it is possible to satisfy simultaneously the cycle life, the discharge characteristics under low temperatures, and the discharge characteristics under a large current.

As described previously, it is desirable to use in the present invention DEC, EMC and DMC as the chain carbonates. Among these chain carbonates, DEC has the lowest relative dielectric constant, EMC has the intermediate relative dielectric constant, and DMC has the highest relative dielectric constant. On the other hand, the electrolyte as the solute is most easily dissolved in DMC and is most unlikely to be dissolved in DEC. EMC is intermediate between DMC and DEC in terms of the solubility of the electrolyte. A nonaqueous solvent containing DEC is low in its relative dielectric constant. Also, if a required amount of a solute is dissolved in the nonaqueous solvent containing DEC, the solute concentration is considered to be rendered substantially equal to the saturated solute concentration of the nonaqueous solvent. As a result, it is possible to suppress the elution of $Li_2S$, which is a product of charging, into the nonaqueous solvent containing DEC. It follows that the reversibility of the reaction taking place in the charge-discharge step can be increased so as to improve the charge-discharge cycle life of the secondary battery.

Dipropyl carbonate and ethyl propyl carbonate are chain carbonates having a low relative dielectric constant like DEC, EMC and DMC. However, a nonaqueous solvent containing dipropyl carbonate or ethyl propyl carbonate is markedly low in the solubility of the electrolyte as the solute so as to make it difficult to improve the charge-discharge cycle life of the secondary battery.

It is possible for the nonaqueous solvent to contain an additional solvent other than the chain carbonate and the cyclic carbonate, if amount of the additional solvent is small enough to prevent the cycle life of the secondary battery from being impaired, e.g., not larger than 5% by volume. The additional solvent noted above includes, for example, γ-butyrolactone, acetonitrile, methyl propionate, ethyl propionate, a cyclic ether such as tetrahydrofuran or 2-methy tetrahydrofuran, and a chain ether such as dimethoxy ethane or diethoxy ethane.

It is particularly desirable for the nonaqueous solvent to consist essentially of a first solvent consisting of a cyclic carbonate and a second solvent consisting of a chain carbonate. It is desirable for the mixing ratio of the first solvent to the second solvent to satisfy formula (1) given below:

$$S_1:S_2 = 1:2.5 \text{ to } 1:20 \qquad (1)$$

where $S_1$ represents the mixing amount by volume of the first solvent, and $S_2$ represents the mixing amount by volume of the second solvent.

In the conventional lithium battery, the ratio of the cyclic carbonate to the chain carbonate is set in general to fall within a range of between 1:1 and 1:2. This range is appropriate for increasing the dielectric constant or the electrical conductivity so as to improve the battery characteristics of the lithium battery.

However, the present inventors have found that the battery characteristics are deteriorated if the nonaqueous solvent has a high dielectric constant in the case where an Fe-containing sulfide is used as the negative electrode active material. It is considered reasonable to understand that the deterioration of the battery characteristics is caused by the phenomenon that the elution of $Li_2S$ formed in the charging step tends to be promoted with increase in the dielectric constant of the solvent.

The present inventors have also found that the cycle life of the secondary battery can be drastically improved, if the mixing ratio of the chain carbonate is increased so as to set the ratio of the first solvent consisting of the cyclic carbonate to the second solvent consisting of the chain carbonate to fall within a range of between 1:2.5 and 1:20, preferably between 1:4 and 1:6, arriving at the present invention.

To be specific, if the amount of the first solvent is larger than the upper limit of the range noted above, the viscosity of the nonaqueous electrolyte is increased so as to lower the mobility of the ions. In addition, the relative dielectric constant is increased, with the result that the elution of $Li_2S$ formed in the charging step is rendered prominent so as to bring about deterioration of the cycle life. On the other hand, if the amount of the second solvent is larger than the upper limit of the range noted above, it is possible for the electrical conductivity to be lowered so as to lower the charge-discharge efficiency.

Under the circumstances, the mixing ratio of the first solvent to the second solvent is set to fall within a range of between 1:2.5 and 1:20, preferably between 1:4 and 1:6 in the present invention.

(b) Solute (Electrolyte)

The solute used in the present invention includes, for example, an alkali metal salt, particularly lithium salt.

The lithium salt used in the present invention includes, for example, lithium hexafluoro phosphate ($LiPF_6$), lithium tetrafluoro borate ($LiBF_4$), lithium hexafluoro arsenide ($LiAsF_6$), lithium perchlorate ($LiClO_4$), lithium trifluoro metasulfonate ($LiCF_3SO_3$), and $LiN(Q_1SO_2)(Q_2SO_2)$ where $Q_1$ represents $C_mF_{2m+1}$ (m=1, 2, 3, 4) and $Q_2$ represents $C_nF_{2n+1}$ (n=1, 2, 3, 4). It is possible to use a single kind or a plurality of different kinds of the lithium salts exemplified above.

In view of the cycle characteristics, it is desirable to use at least one of lithium hexafluoro phosphate ($LiPF_6$) and lithium perchlorate ($LiClO_4$). Particularly, in the case of using $LiPF_6$, it is possible to obtain excellent cycle characteristics without impairing the safety.

In order to further improve the cycle life, it is desirable to use as the solute a mixed salt comprising a first lithium salt consisting of $LiN(Q_1SO_2)(Q_2SO_2)$ and a second lithium salt consisting of at least one compound selected from the group consisting of $LiPF_6$, $LiBF_4$, $LiClO_4$ and $LiCF_3SO_3$.

It is desirable for the molar ratio $L_1:L_2$ of the first lithium salt ($L_1$) to the second lithium salt ($L_2$) to fall within a range of between 90:10 and 1:99, more desirably between 44:55 and 2:98. If the molar ratio $L_1:L_2$ is set to fall within the range noted above, it is possible to further improve the cycle life of the secondary battery.

Among the first lithium salts exemplified above, it is desirable to use $LiN(CF_3SO_2)_2$ or $LiN(C_2F_5SO_2)_2$. On the other hand, among the second lithium salts exemplified above, it is desirable to use $LiPF_6$ or $LiClO_4$.

It is desirable for the solute to be dissolved in the nonaqueous solvent at a rate of 1 to 2.5 mol/L, more desirably at a rate of 1.2 to 1.5 mol/L.

The polymer materials contained in the gel-like nonaqueous electrolyte include, for example, polyacrylonitrile, polyacrylate, polyvinylidene fluoride (PVdF), polyethylene oxide (PECO), copolymers containing acrylonitrile, acrylate, vinylidene fluoride or ethylene oxide as a monomer unit, and a copolymer containing vinylidene fluoride and hexafluoropropylene.

(5) Case

It is possible for the case to be shaped like, for example, a cylinder having a bottom, a rectangular cylinder having a bottom, or a bag. The case can be formed of, for example, a metal plate, a metal film or a sheet including a resin layer. Particularly, a case formed of a sheet including a resin layer and having a thickness not larger than 0.5 mm is lightweight so as to make it possible to increase the energy density per battery weight.

The sheet including a resin layer includes, for example, a laminate film. To be more specific, a film comprising a metal layer and resin layers arranged on both surfaces of the metal layer can be used as the sheet for forming the case.

The resin layer can be made of, for example, polyethylene or polypropylene. The resin layer in contact with the outside performs the function of an outer protective layer. On the other hand, the resin layer in the contact with the inner region performs the function of an inner protective layer. The outer protective layer plays the role of preventing a damage done to the metal layer in contact with the outer protective layer. Also, the inner protective layer serves to prevent the metal layer in contact with the inner protective layer from being corroded by the nonaqueous electrolyte. Each of the outer protective layer and the inner protective layer is formed of a single kind of a resin layer or a plurality of different kinds of resin layers. Also, if a thermally fusible resin is arranged on the surface of the inner protective layer, it is possible to seal the case by means of heat seal.

The metal layer plays the role of shielding water. It is possible for the metal layer to be formed of, for example, aluminum, stainless steel, iron, copper or nickel. Particularly, it is desirable to use aluminum, which is lightweight and capable of effectively shielding water.

It is possible for the metal layer to be formed of a single kind of a metal. Alternatively, the metal layer can be prepared by making integral a plurality of different kinds of metal layers.

It is desirable for the case to have a thickness not larger than 0.5 mm. If the thickness of the case exceeds 0.5 mm, the capacity per battery weight tends to be lowered. It is more desirable for the thickness of the case to be not larger than 0.3 mm, furthermore desirably not larger than 0.25 mm, and most desirably not larger than 0.15 mm. On the other hand, if the thickness of the case is smaller than 0.05 mm, the case tends to be deformed or broken easily. It follows that it is desirable for the lower limit in the thickness of the case to be set at 0.05 mm. It is more desirable for the lower limit in the thickness of the case to be set at 0.08 mm, furthermore desirably at 0.1 mm.

An example of the second nonaqueous electrolyte battery of the present invention will now be described.

The second nonaqueous electrolyte battery of the present invention comprises a case, an electrode group housed in the case and including a positive electrode and a negative electrode, and a nonaqueous electrolyte held by the electrode group. The negative electrode active material of the negative electrode contains a compound having a composition represented by formula (4) given below:

$$A_zFe_{(1-x)}M_xS_y \qquad (4)$$

where "A" contains at least one kind of an alkali metal, "M" contains at least one element selected from the group consisting of Cu, Ni, Co, Mn, Mg, Al, Si and Cr, the molar ratio x falls within a range of between 0.0003 and 0.03, i.e., $0.0003 \leq x \leq 0.03$, the molar ratio y falls within a range of between 1.08 and 1.33, i.e., $1.08 \leq y \leq 1.33$, and the molar ratio z is not higher than 2, i.e., $0 \leq z \leq 2$.

In the second nonaqueous electrolyte battery of the present invention, it is possible to arrange a separator between the positive electrode and the negative electrode. It is also possible to arrange a gel-like nonaqueous electrolyte layer in place of the separator between the positive electrode and the negative electrode.

A positive electrode, a separator and a case similar to those described previously in conjunction with the first nonaqueous electrolyte battery of the present invention can be used in the second nonaqueous electrolyte battery of the present invention.

The negative electrode and the nonaqueous electrolyte used in the second nonaqueous electrolyte battery of the present invention will now be described in the following.

(5) Negative Electrode

The negative electrode can be prepared by, for example, suspending a negative electrode active material, a conductive agent and a binder in a suitable solvent so as to prepare a suspension, followed by coating a current collector with the resultant suspension and subsequently drying and pressing the current collector coated with the suspension.

It is desirable to use an aluminum foil as the current collector in order to make the nonaqueous electrolyte battery lightweight and to improve the weight energy density. Also, it is possible for the aluminum foil to contain trace elements such as Si or Mg, which permits improving the mechanical strength and the corrosion resistance of the current collector.

A sulfide of a metal can be used as the negative electrode active material. The metal portion of the metal sulfide includes, for example, Fe, Ni, Co, Cu, Ti or Mo. If such a metal sulfide is used as the negative electrode active material, it is possible to obtain a nonaqueous electrolyte battery having a high capacity.

It is desirable to use a compound having a composition represented by formula (4a) given below as the negative electrode active material:

$$Fe_{1-x}M_xS_y \qquad (4a)$$

where "M" contains at least one element selected from the group consisting of Cu, Ni, Co, Mn, Mg, Al, Si and Cr, the molar ratio x falls within a range of between 0.0003 and 0.03, i.e., $0.0003 \leq x \leq 0.03$, and the molar ratio y falls within a range of between 1.08 and 1.33, i.e., $1.08 \leq y \leq 1.33$.

Among the metal sulfides, sulfide of Fe permits obtaining a high capacity. It is possible to obtain a nonaqueous electrolyte battery having a high capacity and, at the same time, a long cycle life in the case of using a negative electrode active material including a sulfide containing of Fe as well as at least one element selected from the group consisting of Cu, Ni, Co, Mn, Mg, Al, Si and Cr.

It is more desirable to use a compound having a composition represented by formula (4b) given below as the negative electrode active material:

$$A_zFe_{1-x}M_xS_y \qquad (4b)$$

where "A" contains at least one kind of an alkali metal element, "M" contains at least one element selected from the group consisting of Cu, Ni, Co, Mn, Mg, Al, Si and Cr, the molar ratio x falls within a range of between 0.0003 and 0.03, i.e., $0.0003 \leq x \leq 0.03$, the molar ratio y falls within a range of between 1.08 and 1.33, i.e., $1.08 \leq y \leq 1.33$, and the molar ratio z falls within a range of between 0 and 2, i.e., $0 \leq z \leq 2$.

What should be noted is that it is possible to obtain a nonaqueous electrolyte battery having higher cycle characteristics by allowing the sulfide represented by formula (4a) to contain an alkali metal in a mixing ratio z. Among the alkali metals, it is desirable to use Li. By using Li as the element A, it is possible to improve the stability in the crystal structure of the sulfide and to improve the initial Coulomb efficiency. The mixing ratio z of the alkali metal can be set at 2 or less ($0<z \leq 2$), because it is theoretically possible for two atoms of the alkali metal such as Li to be bonded to one sulfur atom.

In the lithium secondary battery comprising the negative electrode active material containing a compound having a composition represented by formula (4a), the composition of the particular compound is not changed before the charge-discharge operation. However, if the charge-discharge operation is once applied to the lithium secondary battery, the composition of the compound is changed by Li remaining as the irreversible capacity. The composition after the change can be represented by formula (4b) given above.

The molar ratios x and y in the compound having a composition represented by formula (4a) given above will now be described.

In order achieve both a high discharge capacity and a long cycle life, it is desirable for the molar ratio x to meet the requirement of $0.0003 \leq x \leq 0.03$ and for the molar ratio y to meet the requirement of $1.08 \leq y \leq 1.33$.

If the molar ratio x is lower than 0.0003, the cycle characteristics are lowered. On the other hand, if the molar ratio x exceeds 0.03, the capacity is lowered. It is more desirable for the molar ratio x to meet the requirement of $0.001 \leq x \leq 0.01$.

On the other hand, if the molar ratio y is lower than 1.08, the capacity is lowered. Also, if the molar ratio y exceeds 1.33, the cycle characteristics are lowered. It is more desirable for the molar ratio y to meet the requirement of $1.09 \leq y \leq 1.2$.

Preferred compounds having a composition represented by formula (4a) include, for example, $(Fe_{1-x}M_x)_9S_{10}$ (or $Fe_{1-x}M_xS_{1.11}$ in the expression of the composition conforming with formula (4a)), $(Fe_{1-x}M_x)_{10}S_{11}$ (or $Fe_{1-x}M_xS_{1.1}$ in the expression of the composition conforming with formula (4a)), and $(Fe_{1-x}M_x)_{11}S_{12}$ (or $Fe_{1-x}M_xS_{1.09}$ in the expression of the composition conforming with formula (4a)). Incidentally, "M" in the chemical formula contains at least one element selected from the group consisting of Cu, Ni, Co, Mn, Mg, Al, Si and Cr, and the molar ratio x falls within a range of between 0.0003 and 0.03, i.e., $0.0003 \leq x \leq 0.03$.

Among the elements contained in the negative electrode active material, Cu and Ni are particularly effective for improving the cycle characteristics. It is considered reasonable to understand that the prominent effect of improving the cycle characteristics is produced by the mechanism described below. Specifically, the "M" in the chemical formula contains at least one element selected from the group consisting of Cu, Ni, Co, Mn, Mg, Al, Si and Cr. Since the element M is capable of performing the function of a catalyst serving to promote the discharge reaction on the negative electrode, i.e., the reaction to form the sulfide, it is possible to improve the cycle life of the secondary battery. Since Cu and Ni produce a high catalytic function among the element M, it is possible to improve markedly the cycle life of the secondary battery.

In the negative electrode active material containing a compound represented by formula (4) referred to previously, it is desirable for the diffraction angle 2θ of the maximum peak, where θ represents the Bragg angle, to fall within a range of between 43.6° and 44.1°, i.e., $43.6° \leq 2θ \leq 44.1°$, in the X-ray diffraction using CuKα as the X-ray source. Since the negative electrode active material satisfying the particular condition is capable of increasing the stability of the crystal structure, it is possible to further improve the cycle life of the nonaqueous electrode battery. Incidentally, the term "maximum peak" noted above represents the peak having the highest intensity.

It is desirable for the negative electrode active material to have an average particle diameter falling within a range of between 1 μm and 100 μm, a specific surface area falling within a range of between 0.1 m²/g and 5 m²/g, and a density falling within a range of between 4.3 g/cm³ and 4.8 g/cm³.

If the average particle diameter of the negative electrode active material is smaller than 1 μm, the electrical resistance is increased, with the result that the cycle life tends to be shortened. On the other hand, if the average particle diameter of the negative electrode active material exceeds 100 μm, the collapse of the negative electrode active material is rendered prominent, with the result that the cycle life tends to be shortened.

If the specific surface area of the negative electrode active material is smaller than 0.1 m²/g, the affinity between the negative electrode active material and the nonaqueous electrolyte is rendered poor, with the result that the initial Coulomb efficiency tends to be lowered. On the other hand, if the specific surface area of the negative electrode active material exceeds 5 m²/g, it is possible for the mechanical strength of the negative electrode active material itself to be lowered markedly.

Further, if the density of the negative electrode active material is lower than 4.3 g/cm³, the volume energy density tends to be lowered. On the other hand, if the density of the negative electrode active material exceeds 4.8 g/cm³, the permeability of the nonaqueous electrolyte into the negative electrode active material tends to be decreased. The decrease of the permeability causes deterioration of the cycle characteristics or reduction of the capacity.

It should be noted that, if a compound containing an alkali metal, e.g., Li, such as $LiCoO_2$, $LiMn_2O_4$ or $LiNiO_2$ is contained in advance in the positive electrode included in the nonaqueous electrolyte secondary battery, the alkali metal, e.g., Li, is migrated from the positive electrode into the negative electrode active material at the charge-discharge time, with the result that the negative electrode active material reversibly absorbs and desorbs the alkali metal so as to perform the function of the negative electrode of the secondary battery. Also, since the charge-discharge cycle is stabilized, it is desirable to use a material containing an alkali metal in advance as the negative electrode active material even in the case where a material containing the alkali metal noted above is used as the positive electrode. It is possible to obtain a nonaqueous electrolyte battery having a long cycle life by allowing the negative electrode active material to contain an alkali metal. Also, in the case of using a material that does not contain an alkali metal in advance such as $CoO_2$, $MnO_2$ or $NiO_2$ as the positive electrode active material, it is possible to allow the negative electrode active material to contain in advance an alkali metal or to bring the negative electrode active material that does not contain an alkali metal into contact with an alkali metal so as to permit the alkali metal to be adsorbed electrochemically on the negative electrode active material.

The negative electrode active material containing a compound represented by formula (4) given previously can be prepared by, for example, mixing the raw material compounds or elemental units in a predetermined stoichiometric ratio, followed by subjecting the resultant mixture to a heat treatment under temperatures of 700 to 1,000° C. for 10 to 100 hours under an inert gas atmosphere. Also, it is possible to remove, for example, the unreacted sulfur component by further applying an additional heat treatment to the heat-treated mixture under temperatures of 200 to 400° C. for 10 to 30 minutes under vacuum so as to make it possible to obtain a negative electrode active material closer to a single phase. It should also be noted that, if iodine is added in mixing the raw materials, it is possible to promote the reaction so as to make it possible to synthesize the negative electrode active material in a shorter heat treatment time.

The conductive agent used in the present invention includes, for example, acetylene black, carbon black and graphite. On the other hand, the binder used in the present invention includes, for example, polytetrafluoro ethylene (PTFE), polyvinylidene fluoride (PVdF), fluorine-based rubber, ethylene-butadiene rubber (SBR), and carboxy methyl cellulose (CMC).

In order to improve the conductivity of the negative electrode and to improve the energy density of the nonaqueous electrolyte battery, it is desirable to set the mixing ratios of the negative electrode active material, the conductive agent and the binder such that the content of the negative electrode active material falls within a range of between 70 and 95% by weight, the content of the conductive agent falls within a range of between 0 and 25% by weight, and the content of the binder falls within a range of between 2 and 10% by weight. If the mixing ratio of the negative electrode active material is lower than the lower limit of the range noted above, the energy density tends to be lowered. Also, where the mixing ratios of the conductive agent and the binder are lower than the lower limits of the ranges noted above, it is difficult to obtain a satisfactory conductivity.

(6) Nonaqueous Electrolyte

The nonaqueous electrolyte used in the present invention includes a liquid nonaqueous electrolyte, a gel-like nonaqueous electrolyte and a mixture of a liquid nonaqueous electrolyte and a gel-like nonaqueous electrolyte.

The liquid nonaqueous electrolyte includes, for example, a nonaqueous solvent and a solute dissolved in the nonaqueous solvent. On the other hand, the gel-like nonaqueous electrolyte includes a liquid nonaqueous electrolyte and a polymer material for holding the liquid nonaqueous electrolyte.

The nonaqueous solvent, the solute and the polymer material noted above will now be described in detail as follows.

(A) Solute (Electrolyte)

The solute includes, for example, a salt of an alkali metal, particularly, a lithium salt. The lithium salts used in the present invention include, for example, lithium hexafluoro phosphate ($LiPF_6$), lithium tetrafluoro borate ($liBF_4$), lithium hexafluoro arsenide ($LiAsF_6$), lithium perchlorate ($LiClO_4$), and lithium trifluoro metasulfonate ($LiCF_3SO_3$). Particularly, it is desirable to use the salts of alkali metals of lithium hexafluoro phosphate ($LiPF_6$) or lithium perchlorate ($LiClO_4$) as the solute.

It is desirable for the solute to be dissolved in the nonaqueous solvent at a rate of 0.5 to 3 mol/L.

It is particularly desirable for the solute to contain a first salt represented by $LiN(Q_1SO_2)(Q_2SO_2)$ and a second salt consisting of at least one compound selected from the group consisting of $LiPF_6$, $LiBF_4$, $LiClO_4$ and $LiCF_3SO_3$. It is desirable for the molar ratio $L_1:L_2$ of the first salt ($L_1$) to the second salt ($L_2$) to fall within a range of between 90:10 and 1:99. Incidentally, "$Q_1$" noted above represents $C_mF_{2m+1}$ (m=1, 2, 3, 4), and "$Q_2$" noted above represents $C_nF_{2n+1}$ (n=1, 2, 3, 4).

It is desirable to use a solute containing the first salt and the second salt noted above because the nonaqueous electrolyte prepared by dissolving the solute noted above in a nonaqueous solvent permits the nonaqueous electrolyte battery to exhibit a long cycle life. Further, the particular nonaqueous electrolyte permits improving the large current characteristics.

In order to improve the charge-discharge efficiency and the capacity in discharging at a large current, i.e., the large current characteristics, it is desirable to use $LiN(CF_3SO_2)_2$ or $LiN(C_2F_5SO_2)_2$ as the first lithium salt. It is particularly desirable to use $LiN(C_2F_5SO_2)_2$ because it is possible to form in this case a protective film serving to suppress the decomposition of the positive electrode and the oxidizing decomposition of the nonaqueous electrolyte on the surface of the positive electrode.

It is possible for the second lithium salt to decrease the resistance of the protective film formed on the surface of the positive electrode.

It is desirable to set the molar ratio $L_1:L_2$ of the first lithium salt $L_1$ to the second lithium salt $L_2$ to fall within a range of between 90:10 and 1:99. If the molar ratio $L_1:L_2$ of the first lithium salt $L_1$ to the second lithium salt $L_2$ is set fall within the range noted above, it is possible to decrease the resistance of the protective film formed by the first lithium salt, with the result that it is possible to markedly improve the cycle life and the large current characteristics of the nonaqueous electrolyte battery. If the molar ratio $L_1:L_2$ of the first lithium salt $L_1$ to the second lithium salt $L_2$ fails to fall within the range noted above, the resistance of the positive electrode is rapidly increased, with the result that the cycle life tends to be markedly shortened. Also, it is more desirable for the molar ratio $L_1:L_2$ of the first lithium salt $L_1$ to the second lithium salt $L_2$ to fall within a range of between 44:55 and 2:98.

It is desirable for the total concentration of the first salt and the second salt to fall within a range of between 0.5 and 4 mol/L, more desirably between 1 and 3 mol/L.

(B) Nonaqueous Solvent

It is desirable to use as the nonaqueous solvent a cyclic carbonate, or a mixed solvent consisting essentially of, for example, a cyclic carbonate and a second solvent having a viscosity lower than that of the cyclic carbonate. The cyclic carbonate used in the present invention includes, for example, ethylene carbonate (EC), propylene carbonate (PC) and vinylene carbonate (VC).

On the other hand, the second solvent used in the present invention includes, for example, a chain carbonate, γ-butyrolactone (BL), acetonitrile (AN), methyl propionate, ethyl propionate, a cyclic ether and a chain ether. The chain carbonate used in the present invention includes, for example, dimethyl carbonate (DMC), ethyl methyl carbonate (EMC), and diethyl carbonate (DEC). The cyclic ether includes, for example, tetrahydrofuran (THF) and 2-methyl tetrahydrofuran (2MeTHF). Further, the chain ether used in the present invention includes, for example, dimethoxy ethane (DME) and diethoxy ethane.

Preferred nonaqueous solvents include, for example, a nonaqueous solvent "a" containing EC and EMC, a nonaqueous solvent "b" containing EC and DEC, a nonaqueous solvent "c" containing EC, EMC and DEC, a nonaqueous solvent "d" containing EC, DMC and DEC, and a nonaqueous solvent "e" containing EC, DME and DEC. Particularly, it is desirable to use the nonaqueous solvent "b" and the nonaqueous solvent "c" because these nonaqueous solvents "b" and "c" are low in the dielectric constant and permit suppressing the elution of $Li_2S$ formed as a product of the charging of the negative electrode and causing the deterioration of the cycle characteristics. Also, in each of the nonaqueous solvents "a" to "e", it is desirable to set the volume ratio of EC to fall within a range of between 10 and 30% by volume and to set the volume ratio of DEC not less than 50% by volume.

In the second nonaqueous electrolyte battery of the present invention, it is possible to use the nonaqueous electrolyte described previously in conjunction with the first nonaqueous electrolyte battery in place of the nonaqueous electrolyte described above. It is possible to further improve the cycle life of the nonaqueous electrolyte battery by using the nonaqueous electrolyte described previously in conjunction with the first nonaqueous electrolyte battery of the present invention.

It should be noted that, if carbon is used as the negative electrode active material, the negative electrode active material excessively reacts with the nonaqueous electrolyte in the initial charging step or during storage under high temperatures so as to generate a large amount of gases, leading to the problem that the battery is swollen. In the case of using the negative electrode active material specified in the present invention, however, it is possible to prevent substantially completely the gas generation caused by the reaction of the negative electrode active material with the nonaqueous electrolyte, making it possible to use the negative electrode active material specified in the present invention in a thin type battery of a soft pack type comprising a case formed of a laminate film comprising a metal layer and resin layers formed on both surfaces of the metal layer. In other words, the present invention makes it possible to provide a nonaqueous electrolyte battery substantially free from the swelling of the case.

An example of a third nonaqueous electrolyte battery of the present invention will now be described.

The third nonaqueous electrolyte battery of the present invention comprises a case, an electrode group housed in the case and comprising a positive electrode and a negative electrode, and a nonaqueous electrolyte held by the electrode group. The negative electrode material of the negative electrode contains a complex sulfide containing P and at least one kind of a metal element selected from the group consisting of Fe, Ni, Co, Mn and Cu.

In the third nonaqueous electrolyte battery of the present invention, it is possible to arrange a separator between the positive electrode and the negative electrode. It is also possible to arrange a gel-like nonaqueous electrolyte layer in place of the separator between the positive electrode and the negative electrode.

It is possible to use in the third nonaqueous electrolyte secondary battery the positive electrode, the separator and the case similar to those described previously in conjunction with the first nonaqueous electrolyte battery of the present invention.

The negative electrode and the nonaqueous electrolyte used in the third nonaqueous electrolyte battery of the present invention will now be described in the following.

(7) Negative Electrode

The negative electrode can be prepared by, for example, suspending a negative electrode active material, a conductive agent and a binder in a suitable solvent so as to form a suspension, followed by coating the surface of a metal foil such as a copper foil with the resultant suspension and subsequently drying and pressing the metal foil coated with the suspension.

The negative electrode active material contains metal sulfide containing P and at least one kind of a metal element selected from the group consisting of Fe, Ni, Co, Mn and Cu. The negative electrode containing the particular negative electrode active material permits lowering the potential of the negative electrode relative to the positive electrode. In other words, the negative electrode potential can be positioned on the base side so as to make it possible to obtain a high battery voltage. As a result, it is possible to obtain a nonaqueous electrolyte battery having a high energy density. Among the metal elements contained in the negative electrode active material, Fe, Ni, Co and Mn are particularly effective for improving the cycle characteristics of the battery, and Mn and Fe are effective for increasing the energy density of the battery.

It should be noted that, if a compound containing an alkali metal, e.g., Li, such as $LiCoO_2$, $LiMn_2O_4$ or $LiNiO_2$ is contained in advance in the positive electrode active material in the case where the nonaqueous electrolyte battery is a secondary battery, the alkali metal, e.g., Li, is migrated from the positive electrode into the negative electrode active material at the charge-discharge time, with the result that the negative electrode active material reversibly absorbs and desorbs the alkali metal so as to perform the function of the negative electrode of the secondary battery. Also, it is desirable to use a material containing an alkali metal in advance as the negative electrode active material even in the case where a material containing the alkali metal noted above is used as the positive electrode. It is possible to obtain a nonaqueous electrolyte battery having a long cycle life by allowing the negative electrode active material to contain an alkali metal. Also, in the case of using a material that does not contain an alkali metal in advance such as $CoO_2$, $MnO_2$ or $NiO_2$ as the positive electrode active material, it is possible to allow the negative electrode active material to contain in advance an alkali metal or to bring the negative electrode active material that does not contain an alkali metal into contact with an alkali metal so as to permit the alkali metal to be adsorbed electro-chemically on the negative electrode active material.

It should also be noted that it is possible to suppress the elution of S contained in the negative electrode active material into the nonaqueous electrolyte by allowing the negative electrode active material to contain an alkali metal element, thereby improving the cycle characteristics of the nonaqueous electrolyte battery. Among the alkali metals, it is particularly desirable to use Na or K. It should be noted that a complex sulfide containing P, at least one kind of a metal element selected from the group consisting of Fe, Ni, Co, Mn and Cu, and at least one kind of an alkali metal element selected from the group consisting of Na and K makes it possible to markedly improve the cycle characteristics of the nonaqueous electrolyte battery.

Among the negative electrode active materials, it is desirable to use a compound having a composition represented by formula (5) given below:

$$A_aM1P_bS_c \qquad (5)$$

where "A" includes at least one kind of an alkali metal element, "M1" includes at least one kind of an element selected from the group consisting of Fe, Ni, Co, Mn and Cu, the molar ratio "a" falls within a range of between 0 and 12, i.e., $0 \leq a \leq 12$, the molar ratio "b" falls within a range of between 0.1 and 1.1, i.e., $0.1 \leq b \leq 1.1$, and the molar ratio "c" falls within a range of between 0.9 and 3.3, i.e., $0.9 \leq c \leq 3.3$.

The compound having a composition represented by formula (5) given above, which is used as a negative electrode active material, permits improving both the energy density and the cycle life of the secondary battery.

It is desirable for the molar ratio b of P to fall within a range of between 0.1 and 1.1, i.e., $0.1 \leq b \leq 1.1$. If the molar ratio b is lower than 0.1, the shifting width of the negative electrode potential toward the base side is decreased so as to make it difficult to obtain a high battery voltage. On the other hand, if the molar ratio b exceeds 1.1, the cycle characteristics of the nonaqueous electrolyte battery tend to be lowered. It is more desirable for the molar ratio b of P to fall within a range of between 0.9 and 1.1, i.e., $0.9 \leq b \leq 1.1$.

It is possible to obtain a nonaqueous electrolyte battery having a high capacity by setting the molar ratio "c" of S to fall within a range of between 0.9 and 3.3. Also, it is possible to suppress the elution of S contained in the negative electrode active material into the nonaqueous electrolyte by setting the molar ratio "a" of the alkali metal at 12 or less (including 0), with the result that it is possible to improve the cycle characteristics of the nonaqueous electrolyte battery.

Among the compounds having a composition represented by formula (5) given previously, it is desirable to use a compound having a composition represented by formula (6) given below:

$$A_aM(PS_3)_z \qquad (6)$$

where "A" contains at least one kind of an alkali metal, M represents at least one kind of a transition metal selected from the group consisting of Fe, Ni, Co, Mn and Cu, the molar ratio "a" falls within a range of between 0 and 12, i.e., $0 \leq a \leq 12$, and the molar ratio "z" falls within a range of between 0.9 and 1.1, i.e., $0.9 \leq z \leq 1.1$.

The compound having a composition represented by formula (6) given above has a stoichiometric composition so as to make it possible to further improve the stability of the crystal structure. Also, it is possible to further increase the energy density of the nonaqueous electrolyte battery.

The reasons for defining the molar ratio "a" and the molar ratio "z" as above are similar to those described previously in conjunction with the compound having a composition represented by formula (5).

In a lithium secondary battery comprising a negative electrode active material containing a metal sulfide to which an alkali metal is not added, there is no change in the composition of the metal sulfide before application of the charge-discharge operation to the secondary battery. However, if the charge-discharge operation is once applied to the secondary battery, the composition of the compound is changed by Li remaining as an irreversible capacity. It is desirable for the changed composition to be represented by formula (5) or formula (6) given above.

The negative electrode active material can be prepared by, for example, mixing the raw material compounds or elemental units in a predetermined stoichiometric ratio, followed by subjecting the resultant mixture to a heat treatment under temperatures of 700 to 1,000° C. for 10 to 100 hours under an inert gas atmosphere. Also, it is possible to remove, for example, the unreacted sulfur component by further applying an additional heat treatment to the heat-treated mixture under temperatures of 200 to 400° C. for 10 to 30 minutes under vacuum so as to make it possible to obtain a negative electrode active material closer to a single phase. It should also be noted that, if iodine is added in mixing the raw materials, it is possible to promote the reaction so as to make it possible to synthesize the negative electrode active material in a shorter heat treatment time.

The conductive agent used in the present invention includes, for example, acetylene black, carbon black and graphite. On the other hand, the binder used in the present invention includes, for example, polytetrafluoro ethylene (PTFE), polyvinylidene fluoride (PVdF), fluorine-based rubber, ethylene-butadiene rubber, and carboxy methyl cellulose (CMC).

In order to improve the conductivity of the negative electrode and to improve the energy density of the nonaqueous electrolyte battery, it is desirable to set the mixing ratios of the negative electrode active material, the conductive agent and the binder such that the content of the negative electrode active material falls within a range of between 70 and 95% by weight, the content of the conductive agent falls within a range of between 0 and 25% by weight, and the content of the binder falls within a range of between 2 and 10% by weight. If the mixing ratio of the negative electrode active material is lower than the lower limit of the range noted above, the energy density tends to be lowered. Also, where the mixing ratios of the conductive agent and the binder are lower than the lower limits of the ranges noted above, it is difficult to obtain a satisfactory conductivity.

(8) Nonaqueous Electrolyte

The nonaqueous electrolyte used in the third nonaqueous electrolyte battery of the present invention includes, for example, a liquid nonaqueous electrolyte, a polymer gel-like electrolyte, a polymer solid electrolyte, and an inorganic solid electrolyte having a lithium ionic conductivity.

The liquid nonaqueous electrolyte can be prepared by, for example, dissolving a solute in a nonaqueous solvent. The polymer gel-like electrolyte comprises the liquid nonaqueous electrolyte and a polymer material serving to hold the liquid nonaqueous electrolyte. Further, the polymer solid electrolyte comprises a solute and a polymer material serving to hold the solute.

It is desirable to use as the nonaqueous solvent a cyclic carbonate such as ethylene carbonate (EC) or propylene carbonate (PC) and a mixed solvent consisting essentially of the cyclic carbonate and a second solvent having a viscosity lower than that of the cyclic carbonate.

The second solvent noted above includes, for example, a chain carbonate, γ-butyrolactone (BL), acetonitrile (AN), methyl propionate, ethyl propionate, a cyclic ether and a chain ether. The chain carbonate includes, for example, dimethyl carbonate (DMC), ethyl methyl carbonate (EMC), and diethyl carbonate (DEC). The cyclic ether includes, for example, tetrahydrofuran (THF) and 2-methyl tetrahydrofuran (2MeTHF). Further, the chain ether includes, for example, dimethoxy ethane (DME) and diethoxy ethane.

The solute used in the third nonaqueous electrolyte battery of the present invention includes, for example, salts of alkaline metals, particularly, lithium salt. The lithium salt includes, for example, lithium hexafluoro phosphate ($LiPF_6$), lithium tetrafluoro borate ($LiBF_4$), lithium hexafluoro arsenide ($LiAsF_6$), lithium perchlorate ($LiClO_4$), trifluoro metasulfonate ($LiCF_3SO_3$), and $LiN(C_2F_5SO_2)_2$. Particularly, it is desirable to use lithium hexafluoro phosphate ($LiPF_6$) or lithium tetrafluoro borate ($LiBF_4$).

It is desirable for the solute to be dissolved in the nonaqueous solvent at a rate of 0.5 to 3 mol/L.

The gel-like nonaqueous electrolyte is prepared by dissolving the nonaqueous solvent and the solute in a polymer material. The polymer material used in the present invention includes, for example, polyacrylonitrile, polyacrylate, polyvinylidene fluoride (PVdF), polyethylene oxide (PEO), and copolymers containing acrylonitrile, acrylate, vinylidene fluoride or ethylene oxide as a monomer unit.

The solid electrolyte is prepared by dissolving the solute in the polymer material. The polymer material used in the present invention includes, for example, polyacrylonitrile, polyvinylidene fluoride (PVdF), polyethylene oxide (PEO), and copolymers containing acrylonitrile, vinylidene fluoride or ethylene oxide as a monomer unit.

The inorganic solid electrolyte used in the present invention includes, for example, a ceramic material containing lithium. To be more specific, it is desirable to use $Li_3N$ or $Li_3PO_4$—$Li_2S$—$SiS_2$ glass as the inorganic solid electrolyte.

In the third nonaqueous electrolyte battery of the present invention, it is possible to use the nonaqueous electrolyte described previously in conjunction with the first nonaqueous electrolyte battery in place of the nonaqueous electrolytes described above. If the sulfide containing P and Fe is used as the negative electrode active material, it is possible to further increase the cycle life of the nonaqueous electrolyte battery by using the nonaqueous electrolytes described previously in conjunction with the first nonaqueous electrolyte battery of the present invention.

A cylindrical nonaqueous electrolyte secondary battery, which is an example of the first to third nonaqueous electrolyte batteries of the present invention, will now be described with reference to FIG. 1.

As shown in the drawing, an insulating body 2 is arranged in a bottom portion of a cylindrical case 1 made of, for example, stainless steel. An electrode group 3 is housed in the case 1. The electrode group 3 is prepared by spirally winding a band-like laminate structure including a positive electrode 4, a separator 5, a negative electrode 6 and another separator 5, which are laminated one upon the other in the order mentioned, such that the separator 5 is positioned on the outside.

A nonaqueous electrolyte is held by the electrode group 3. An insulating paper sheet 7 having an opening formed in the central portion is arranged above the electrode group 3 within the case 1. An insulating sealing plate 8 is arranged in the upper opening of the case 1 and the region in the vicinity of the upper opening is caulked inward so as to fix the sealing plate 8 to the case 1. A positive electrode terminal 9 is fitted into the center of the insulating sealing plate 8. Further, a positive electrode lead 10 is connected at one end to the positive electrode 4 and is connected at the other end to the positive electrode terminal 9.

Figure 3:
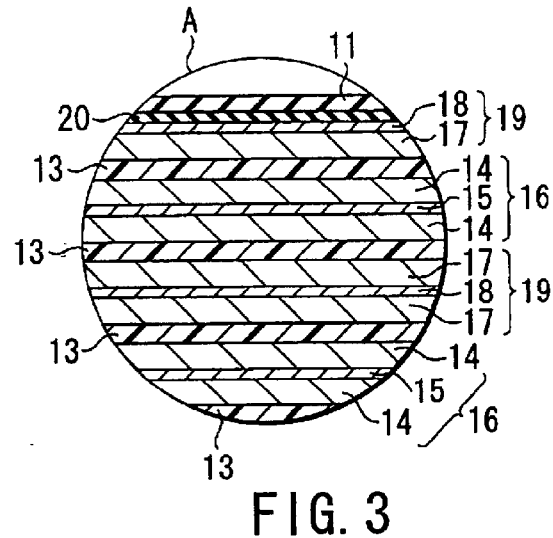
FIG. 3 is a cross sectional view showing in a magnified fashion portion "A" shown in FIG. 2.
Figure 2:
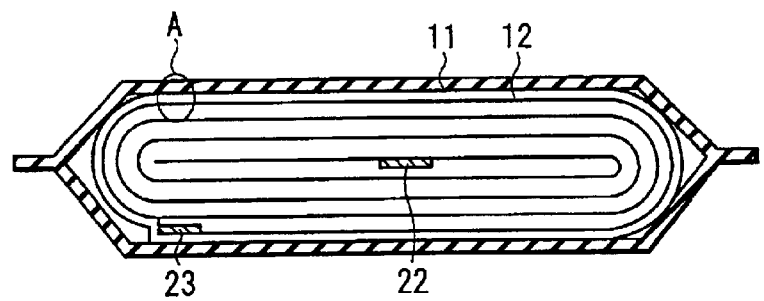
FIG. 2 is a partial cross sectional view showing the construction of a thin type nonaqueous electrolyte battery according to another embodiment of the present invention.

A thin type nonaqueous electrolyte secondary battery, which is another example of the first to third nonaqueous electrolyte batteries of the present invention, will now be described with reference to FIGS. 2 to 4. Specifically, FIG. 2 is a partial cross sectional view showing the construction of a thin type nonaqueous electrolyte battery of a soft pack type according to one embodiment of the present invention. FIG. 3 is a cross sectional view showing in a magnified fashion a portion A shown in FIG. 2. Further, FIG. 3 schematically shows the construction of the boundary region among the positive electrode, the separator and the negative electrode.

As shown in FIG. 3, an electrode group 12 is surrounded by a case 11. The electrode group 12 comprises a separator 13; a positive electrode 16 including a positive electrode layer 14, a positive electrode current collector 15 and another positive electrode layer 14; a separator 13; a negative electrode 19 including a negative electrode layer 17, a negative electrode current collector 18 and another negative electrode layer 17; a separator 13; a positive electrode 16 including a positive electrode layer 14, a positive electrode current collector 15 and another positive electrode layer 14; a separator 13; and a negative electrode 19 including a negative electrode layer 17 and a negative electrode current collector 18; which are laminated one upon the other in the order mentioned. It should be noted that the electrode group 12 is arranged such that the negative electrode current collector is positioned to constitute the outermost layer. Also, a bonding layer 20 is formed on the surface of the electrode group 12 such that the bonding layer 20 is in contact with the inner surface of the case 11.

Figure 4:
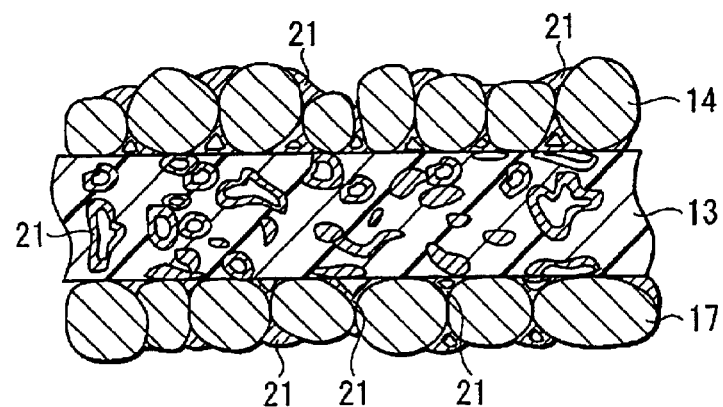
FIG. 4 schematically shows the construction of the boundary region among the positive electrode, the separator and the negative electrode included in the thin type nonaqueous electrolyte battery shown in FIG. 2.

As shown in FIG. 4, a polymer material 21 having an adhesivity is held in the clearance among the positive electrode layer 14, the separator 13 and the negative electrode layer 17. The positive electrode 16 is bonded to the separator 13 by the polymer material 21 having an adhesivity, which is present inside the positive electrode layer 14, inside the separator 13 and at the boundary between the positive electrode layer 14 and the separator 13. On the other hand, the negative electrode 19 is bonded to the separator 13 by the polymer material 21 having an adhesivity, which is present inside the negative electrode layer 17, inside the separator 13 and at the boundary between the negative electrode layer 17 and the separator 13. The nonaqueous electrolyte is held by the electrode group 12 housed in the case 11. A band-like positive electrode lead 22 is connected at one end to the positive electrode current collector 15 of the electrode group 12, and other end portion of the band-like positive electrode lead 22 extends to the outside from within the case 11. On the other hand, a band-like negative electrode lead 23 is connected at one end to the negative electrode current collector 18 of the electrode group 12, and the other end portion of the band-like negative electrode lead 23 extends to the outside from within the case 11.

Incidentally, FIG. 3 shows that the bonding portion 20 is formed on the entire surface of the electrode group 12. Alternatively, it is also possible to form the bonding portion 20 on a part of the electrode group 12. Where the bonding portion 20 is formed on a part of the electrode group 12, it is desirable to form the bonding portion 20 on the surface corresponding to at least the outermost circumference of the electrode group 12. Further, it is possible to omit the bonding portion 20.

In the example shown in FIGS. 2 to 4, the positive electrode, the negative electrode and the separator are made integral by using a polymer material having an adhesivity. Alternatively, it is also possible to prepare the electrode group by winding in a flat shape the positive electrode and the negative electrode with the separator interposed therebetween, followed by applying a thermal press to the resultant wound structure. Further, the shape of the electrode group is not limited to a flat shape. Specifically, it is possible for the electrode group to be of a folded structure in which the positive electrode and the negative electrode are folded with the separator interposed therebetween, or of a laminate structure in which the positive electrode, the separator and the negative electrode are laminated one upon the other a plurality of times in the order mentioned.

In FIGS. 1 to 4, the technical idea of the present invention is applied to a cylindrical nonaqueous electrolyte battery and a thin type nonaqueous electrolyte battery. In addition, it is also possible to apply the technical idea of the present invention to nonaqueous electrolyte batteries of other types such as a rectangular nonaqueous electrolyte battery and a button type nonaqueous electrolyte battery.

Some Examples of the present invention will now be described with reference to the accompanying drawings.

EXAMPLE 1

<Preparation of Positive Electrode>

A slurry was prepared by mixing 91 parts by weight of a powder of lithium cobalt oxide ($LiCoO_2$), which was used as a positive electrode active material, 2.5 parts by weight of acetylene black used as a conductive agent, 3 parts by weight of graphite used as a conductive agent, and 4 parts by weight of polyvinylidene fluoride (PVdF) used as a binder in an N-methyl pyrrolidone (NMP) solution. Then, a current collector formed of an aluminum foil having a thickness of 15 μm was coated with the resultant slurry, followed by drying and subsequently pressing the current collector coated with the slurry so as to prepare a positive electrode having an electrode density of 3.0 g/cm$^3$.

<Preparation of Negative Electrode>

A slurry was prepared by mixing 85 parts by weight of a powder of $Fe_9S_{10}$ having an average particle diameter of 38 μm, 5 parts by weight of graphite used as a conductive agent, 3 parts by weight of acetylene black used as a conductive agent, and 7 parts by weight of PVdF used as a binder in an N-methyl pyrrolidone (NMP) solution. Then, a current collector formed of an aluminum foil having a thickness of 15 μm was coated with the resultant slurry, followed by drying and subsequently pressing the current collector coated with the slurry so as to prepare a negative electrode.

<Preparation of Electrode Group>

The positive electrode described above, a separator formed of a polyethylene porous film, the negative electrode described above, and a separator formed of a polyethylene porous film were laminated in the order mentioned, followed by spirally winding the resultant laminate structure such that the negative electrode was positioned to constitute the outermost circumferential surfaced so as to prepare an electrode group.

<Preparation of Liquid Nonaqueous Electrolyte>

A nonaqueous solvent was prepared by mixing a first solvent of ethylene carbonate (EC) and a second solvent of diethyl carbonate (DEC) at a mixing ratio by volume of 1:2.5. The content of the first solvent in the nonaqueous solvent thus prepared was 29% by volume. Also, the content of the second solvent in the nonaqueous solvent thus prepared was 71% by volume. A liquid nonaqueous electrolyte was prepared by dissolving lithium hexafluoro phosphate ($LiPF_6$) in the nonaqueous solvent in a concentration of 1.2 mol/L so as to obtain a liquid nonaqueous electrolyte.

Then, the electrode group and the liquid nonaqueous electrolyte prepared as above were housed in a cylindrical case made of a stainless steel so as to assemble a cylindrical nonaqueous electrolyte secondary battery constructed as shown in FIG. 1.

EXAMPLES 2 TO 18 AND COMPARATIVE EXAMPLES 1 to 3

A cylindrical nonaqueous electrolyte secondary battery was assembled as in Example 1, except that the compositions of the nonaqueous solvents were changed as shown in Table 1. Incidentally, Table 1 shows the volume ratio of ethylene carbonate (EC), the volume ratio of propylene carbonate (PC), the content of the first solvent determined on the basis that the entire volume of the nonaqueous solvent was set at 100% by volume, the volume ratio $S_1$ of the first solvent, the volume of diethyl carbonate (DEC), the content of DEC in the second solvent, the volume ratio of ethyl methyl carbonate (EMC), the volume ratio $S_2$ of the second solvent, and the content of the second solvent determined on the basis that the entire volume of the nonaqueous solvent was set at 100% by volume.

COMPARATIVE EXAMPLE 4

A cylindrical nonaqueous electrolyte secondary battery was assembled as in Example 6, except that a powdery mesophase pitch based carbon fiber having a fiber diameter of 8 μm, an average fiber length of 20 μm and an average interplanar spacing ($d_{002}$) of 0.336 nm, which was subjected to a heat treatment at 3,000° C., was used as the negative electrode active material in place of the powdery $Fe_9S_{10}$.

COMPARATIVE EXAMPLE 5

A cylindrical nonaqueous electrolyte secondary battery was assembled as in Example 6, except that a NiS powder was used as the negative electrode active material in place of the Fe$_9$S$_{10}$ powder.

COMPARATIVE EXAMPLE 6

A cylindrical nonaqueous electrolyte secondary battery was assembled as in Example 6, except that a CuS powder was used as the negative electrode active material in place of the Fe$_9$S$_{10}$ powder.

COMPARATIVE EXAMPLE 7

A cylindrical nonaqueous electrolyte secondary battery was assembled as in Example 6, except that a CoS powder was used as the negative electrode active material in place of the Fe$_9$S$_{10}$ powder.

The cycle life and the discharge characteristics under low temperatures were evaluated by the methods described below in respect of the secondary battery prepared in each of Examples 1 to 18 and Comparative Examples 1 to 7.

<Cycle Life>

The cycle life was measured by applying a charge-discharge cycle in which each of the secondary batteries was charged to 2.8V under a current of 0.5 CmA for 3 hours, followed by discharging the secondary battery to 1V under a current of 0.5 CmA. Incidentally, the cycle life was determined by the number of charge-discharge cycles at the time when the discharge capacity was lowered to 80% of the discharge capacity at the first cycle.

<Discharge Characteristics Under Low Temperatures>

The discharge capacity at 20° C. was measured by applying under an environment of 20° C. a constant current-constant voltage charging to each of the secondary batteries under a current of 1 CmA and a voltage of 2.8V, followed by applying under an environment of 20° C. a constant current discharge to 1.0V under a current of 0.5 CmA. Also, the discharge capacity at −20° C. was measured by applying under an environment of 20° C. a constant current-constant voltage charging to each of the secondary batteries under a current of 1 CmA and a voltage of 2.8V, followed by applying under an environment of −20° C. a constant current discharge to 1.0V under a current of 0.5 CmA.

Table 1 also shows as the discharge characteristics under low temperatures the discharge capacity at −2° C. on the basis that the discharge capacity at 20° C. was set at 100%.

TABLE 1

| | First solvent | | | Second solvent | | | | | Cycle life | Discharge characteristics under low temperatures (%) |
|---|---|---|---|---|---|---|---|---|---|---|
| | EC | PC | S$_1$ | Content (vol. %) | DEC | The content of DEC in the second solvent | EMC | S$_2$ | Content (vol. %) | | |
| Comparative Example 1 | 1 | — | 1 | 50 | 1 | (100 vol. %) | — | 1 | 50 | 200 | 65 |
| Example 1 | 1 | — | 1 | 29 | 2.5 | (100 vol. %) | — | 2.5 | 71 | 400 | 65 |
| Example 2 | 1 | — | 1 | 25 | 3 | (100 vol. %) | — | 3 | 75 | 450 | 65 |
| Example 3 | 1 | — | 1 | 20 | 4 | (100 vol. %) | — | 4 | 80 | 530 | 60 |
| Example 4 | — | 1 | 1 | 20 | 4 | (100 vol. %) | — | 4 | 80 | 510 | 65 |
| Example 5 | 1 | — | 1 | 17 | 5 | (100 vol. %) | — | 5 | 83 | 570 | 60 |
| Example 6 | 1 | — | 1 | 14 | 6 | (100 vol. %) | — | 6 | 86 | 600 | 60 |
| Example 7 | — | 1 | 1 | 14 | 6 | (100 vol. %) | — | 6 | 86 | 570 | 65 |
| Example 8 | 1 | — | 1 | 14 | 5 | (83 vol. %) | 1 | 6 | 86 | 550 | 60 |
| Example 9 | 1 | — | 1 | 14 | 4 | (67 vol. %) | 2 | 6 | 86 | 500 | 60 |
| Example 10 | 1 | — | 1 | 14 | 3 | (50 vol. %) | 3 | 6 | 86 | 450 | 65 |
| Example 11 | 1 | — | 1 | 13 | 2.5 | (38 vol. %) | 4 | 6.5 | 87 | 430 | 70 |
| Example 12 | 1 | — | 1 | 14 | 1 | (17 vol. %) | 5 | 6 | 86 | 400 | 75 |
| Example 13 | 1 | — | 1 | 11 | 8 | (100 vol. %) | — | 8 | 89 | 530 | 50 |
| Example 14 | — | 1 | 1 | 11 | 8 | (100 vol. %) | — | 8 | 89 | 500 | 55 |
| Example 15 | 1 | — | 1 | 9 | 10 | (100 vol. %) | — | 10 | 91 | 530 | 45 |
| Example 16 | 1 | — | 1 | 8 | 12 | (100 vol. %) | — | 12 | 92 | 520 | 40 |
| Example 17 | 1 | — | 1 | 6 | 15 | (100 vol. %) | — | 15 | 94 | 500 | 40 |
| Example 18 | 1 | — | 1 | 5 | 20 | (100 vol. %) | — | 20 | 95 | 450 | 35 |
| Comparative Example 2 | 1 | — | 1 | 3 | 30 | (100 vol. %) | — | 30 | 97 | 200 | 15 |
| Comparative Example 3 | — | — | 0 | 0 | 1 | (100 vol. %) | — | 1 | 100 | 150 | 10 |
| Comparative Example 4 | 1 | — | 1 | 14 | 6 | (100 vol. %) | — | 6 | 86 | 200 | 40 |
| Comparative Example 5 | 1 | — | 1 | 14 | 6 | (100 vol. %) | — | 6 | 86 | 20 | 30 |
| Comparative Example 6 | 1 | — | 1 | 14 | 6 | (100 vol. %) | — | 6 | 86 | 30 | 30 |
| Comparative Example 7 | 1 | — | 1 | 14 | 6 | (100 vol. %) | — | 6 | 86 | 20 | 30 |

As apparent from Table 1, the secondary batteries for Examples 1 to 18 were found to be superior to the secondary batteries for Comparative Examples 1 to 7 in the cycle life. Also, it is apparent from Table 1 that it is effective for the second solvent to contain at least 60% by volume of diethyl carbonate.

Particularly, it is seen that the secondary batteries for Examples 3 to 8 were found to be superior to the secondary batteries for Examples 13 to 18, in which the content of the second solvent in the nonaqueous solvent was 89 to 95% by volume, in the discharge characteristics under low temperatures.

Further, the experimental date for Comparative Example 4 indicates that, if the nonaqueous electrolyte for Example 6 is used in the case of using a carbonaceous material as the negative electrode active material, both the cycle life and the discharge characteristics under low temperatures are deteriorated.

On the other hand, it is seen that it is impossible to improve the cycle life even if the nonaqueous electrolyte for Example 6 is used in the case of using a sulfide to which Fe is not added as the negative electrode active material.

EXAMPLE 19

<Preparation Liquid Nonaqueous Electrolyte>

A nonaqueous solvent was prepared by mixing a first solvent of ethylene carbonate (EC) with a second solvent of diethyl carbonate (DEC) at a mixing ratio by volume of 1:6. The content of the first solvent in the nonaqueous solvent was 14% by volume, with the content of the second solvent in the nonaqueous solvent being 86% by volume. Then, a liquid nonaqueous electrolyte was prepared by dissolving lithium perchlorate ($LiClO_4$) in the nonaqueous solvent at a concentration of 0.5 mol/L.

A cylindrical nonaqueous electrolyte secondary battery was assembled as in Example 19, except that used was the liquid nonaqueous electrolyte referred to above.

EXAMPLES 20 TO 23

A cylindrical nonaqueous electrolyte secondary battery was assembled as in Example 1, except that the concentration of $LiClO_4$ in the nonaqueous solvent was changed as shown in Table 2.

The cycle life of each of the secondary batteries prepared in Examples 19 to 23 was measured as in Example 1, with the result as shown in Table 2.

TABLE 2

|  | First solvent | | Second solvent | | Solute ($LiClO_4$) | |
|---|---|---|---|---|---|---|
|  | EC | Content (vol. %) | DEC | Content (vol. %) | Concentration (mol/L) | Cycle life |
| Example 19 | 1 | 14 | 6 | 86 | 0.5 | 400 |
| Example 20 | 1 | 14 | 6 | 86 | 1 | 550 |
| Example 21 | 1 | 14 | 6 | 86 | 2 | 600 |
| Example 22 | 1 | 14 | 6 | 86 | 2.5 | 550 |
| Example 23 | 1 | 14 | 6 | 86 | 3 | 400 |

As apparent from Table 2, the cycle life of the secondary battery for each of Examples 20 to 22, in which the solute concentration in the nonaqueous solvent fell within a range of between 1 and 2.5 mol/L, were found to be longer than those of for each Examples 19 and 23.

EXAMPLE 24

<Preparation Liquid Nonaqueous Electrolyte>

A nonaqueous solvent was prepared by mixing a first solvent of ethylene carbonate (EC) with a second solvent of diethyl carbonate (DEC) at a mixing ratio by volume of 1:6. The content of the first solvent in the nonaqueous solvent was 14% by volume, with the content of the second solvent in the nonaqueous solvent being 86% by volume. Then, a liquid nonaqueous electrolyte was prepared by dissolving lithium hexafluoro phosphate ($LiPF_6$) in the nonaqueous solvent thus prepared at a concentration of 1.5 mol/L.

A cylindrical nonaqueous electrolyte secondary battery was assembled as in Example 1, except that used was the liquid nonaqueous electrolyte referred to above.

EXAMPLE 25

<Preparation Liquid Nonaqueous Electrolyte>

A liquid nonaqueous electrolyte was prepared by dissolving 1.25 mol/L of lithium hexafluoro phosphate ($LiPF_6$) and 0.25 mol/L of $LiN(C_2F_5SO_2)_2$ in a nonaqueous solvent similar to that used in Example 24.

A cylindrical nonaqueous electrolyte secondary battery was assembled as in Example 1, except that used was the liquid nonaqueous electrolyte referred to above.

EXAMPLES 26 AND 27

A cylindrical nonaqueous electrolyte secondary battery was assembled as in Example 25, except that the concentration of $LiPF_6$ and the concentration of $LiN(C_2F_5SO_2)_2$ were changed as shown in Table 3.

The cycle life of each of the secondary batteries prepared in Examples 24 to 27 was measured as in Example 1, with the result as shown in Table 3.

TABLE 3

|  | First solvent | | Second solvent | | $LiPF_6$ Concentration (mol/L) | $LiN(C_2F_5SO_2)_2$ Concentration (mol/L) | Cycle life |
|---|---|---|---|---|---|---|---|
|  | EC | Content (vol. %) | DEC | Content (vol. %) |  |  |  |
| Example 24 | 1 | 14 | 6 | 86 | 1.5 | 0 | 610 |
| Example 25 | 1 | 14 | 6 | 86 | 1.25 | 0.25 | 660 |
| Example 26 | 1 | 14 | 6 | 86 | 1 | 0.5 | 650 |
| Example 27 | 1 | 14 | 6 | 86 | 0 | 1.5 | 650 |

As apparent from Table 3, the secondary batteries for Examples 25 to 27, in which solute contained $LiN(C_2F_5SO_2)_2$, were found to be superior in the cycle life to the secondary battery for Example 24, in which $LiPF_6$ alone was used as the solute.

EXAMPLE 28

A cylindrical nonaqueous electrolyte secondary battery was assembled as in Example 6, except that a powdery $(Fe_{0.97}Cu_{0.03})_9S_{10}$ was used in place of the powdery $Fe_9S_{10}$ as the negative electrode active material.

EXAMPLE 29

A cylindrical nonaqueous electrolyte secondary battery was assembled as in Example 6, except that a powdery $(Fe_{0.97}Ni_{0.03})_{10}S_{11}$ was used in place of the powdery $Fe_9S_{10}$ as the negative electrode active material.

EXAMPLE 30

A cylindrical nonaqueous electrolyte secondary battery was assembled as in Example 6, except that a powdery $FePS_3$ was used in place of the powdery $Fe_9S_{10}$ as the negative electrode active material.

EXAMPLE 31

A cylindrical nonaqueous electrolyte secondary battery was assembled as in Example 6, except that a powdery $NaFePS_3$ was used in place of the powdery $Fe_9S_{10}$ as the negative electrode active material.

The cycle life of the secondary battery prepared in each of Examples 28 to 31 was measured as in Example 1, with the result as shown in Table 4. Incidentally, the result for Example 6 is also shown in Table 4.

TABLE 4

| | First solvent | | Second solvent | | | |
|---|---|---|---|---|---|---|
| | EC | Content (vol %) | DEC | Content (vol. %) | Negative electrode active material | Cycle life |
| Example 6 | 1 | 14 | 6 | 86 | $Fe_9S_{10}$ | 600 |
| Example 28 | 1 | 14 | 6 | 86 | $(Fe_{0.97}Cu_{0.03})_9S_{10}$ | 670 |
| Example 29 | 1 | 14 | 6 | 86 | $(Fe_{0.97}Ni_{0.03})_{10}S_{11}$ | 650 |
| Example 30 | 1 | 14 | 6 | 86 | $FePS_3$ | 400 |
| Example 31 | 1 | 14 | 6 | 86 | $NaFePS_3$ | 430 |

As apparent from Table 4, the secondary battery for each of Examples 28 and 29 has a cycle life longer than that of the secondary battery for Example 6.

EXAMPLE 32

<Preparation of Separator>

A paste was prepared by mixing 50 parts by weight of P(VdF+HFP), which is a vinylidene fluoride-hexafluoro propylene copolymer, 75 parts by weight of dibutyl phthalate (DBP) used as a plasticizer, and N-methyl pyrrolidone (NMP) used as a solvent, followed by warming the resultant mixture so as to dissolve P(VdF+HFP). Then, a glass substrate was coated with the paste thus obtained, followed by drying the coated glass substrate, thereby obtaining a separator.

<Preparation of Positive Electrode>

A paste was prepared by mixing 100 parts by weight of lithium cobalt oxide ($LiCoO_2$), which was used as a positive electrode active material, 5 parts by weight of acetylene black used as a conductive agent, 10 parts by weight of P(VdF+HFP) copolymer, and 15 parts by weight of dibutyl phthalate (DBP) used as a plasticizer with NMP used as a solvent. Then, a current collector consisting of an aluminum foil having a thickness of 15 μm was coated with the paste thus prepared, followed by drying and subsequently pressing the current collector coated with the paste so as to prepare a positive electrode having an electrode density of 3.0 g/cm³.

<Preparation of Negative Electrode>

A paste was prepared by mixing 100 parts by weight of a powdery $Fe_9S_{10}$ having an average particle diameter of 20 μm, 5 parts by weight of acetylene black used as a conductive agent, 10 parts by weight of P(VdF+HFP) copolymer, and 15 parts by weight of dibutyl phthalate (DBP) used as a plasticizer with NMP used as a solvent. Then, a current collector consisting of an aluminum foil having a thickness of 15 μm was coated with the paste thus prepared, followed by drying and subsequently pressing the current collector coated with the paste so as to prepare a negative electrode having an electrode density of 3.0 g/cm³.

<Preparation of Liquid Nonaqueous Electrolyte>

A nonaqueous solvent was prepared by mixing a first solvent of ethylene carbonate (EC) with a second solvent of diethyl carbonate (DEC) at a mixing ratio by volume of 1:6. The content of the first solvent in the nonaqueous solvent was 14% by volume, with the content of the second solvent in the nonaqueous solvent being 86% by volume. Then, a liquid nonaqueous electrolyte was prepared by dissolving lithium hexafluoro phosphate ($LiPF_6$) in the nonaqueous solvent thus prepared at a concentration of 2 mol/L.

The members prepared as above were laminated one upon the other in the order of the positive electrode, the separator, the negative electrode, and the separator so as to obtain a laminate structure, followed by spirally winding the laminate structure thus obtained such that the negative electrode was positioned to constitute the outermost circumferential layer so as to prepare an electrode group. Then, DBP contained in the electrode group was extracted by using a dibutyl phthalate extracting solution, and the fine pores formed by the extraction were impregnated with the liquid nonaqueous electrolyte so as to obtain a polymer electrolyte battery.

The polymer electrolyte battery thus obtained was found to exhibit satisfactory cycle characteristics like the nonaqueous electrolyte battery prepared in Example 1.

EXAMPLE 33

<Preparation of Positive Electrode>

In the first step, LiOH and $(Ni, Co, Al)(OH)_2$ were mixed so as to prepare a composition shown in Table 5. The resultant mixture was calcined at 750° C. for 24 hours under an oxygen gas stream. The calcined material was pulverized, followed by calcining again the pulverized material under the similar conditions. The pulverizing step and the re-calcining step were repeated 2 times so as to obtain a lithium nickel cobalt aluminum complex oxide having a composition shown in Table 5. The complex oxide thus obtained was used as a positive electrode active material.

The pH value of the positive electrode active material thus prepared was measured as follows, with the result as shown in Table 5.

Specifically, 2 g of the positive electrode active material was added to 100 mL of a pure water so as to prepare an aqueous system, and the pH value was continuously measured at 25° C. by using a pH measuring apparatus, with the stirring rate of the aqueous system set at three rotations per second. The pH value at the time when a change with time in the pH value ceased to be recognized, i.e., at the time when the change of the pH value during one minute was rendered not larger than 0.001, was measured so as to determine the pH value of the positive electrode active material.

In the next step, a slurry was prepared by adding 90 parts by weight of a powdery positive electrode active material, 3 parts by weight of acetylene black, 3 parts by weight of graphite, and 4 parts by weight of polyvinylidene fluoride (PVdF) to an N-methyl pyrrolidone (NMP) solution, followed by kneading the resultant mixture. Then, a current collector consisting of an aluminum foil having a thickness of 15 μm was coated with the slurry thus prepared, followed by drying and subsequently pressing the current collector coated with the slurry so as to prepare a positive electrode having an electrode density of 3.0 g/cm³.

<Preparation of Negative Electrode>

A slurry was prepared by adding 85 parts by weight of a powdery $Fe_9S_{10}$ having an average particle diameter of 10 μm, 5 parts by weight of graphite, 3 parts by weight of acetylene black, and 7 parts by weight of PVdF to an NMP solution, followed by kneading the resultant mixture. Then, a current collector consisting of an aluminum foil having a thickness of 15 µm was coated with the slurry thus prepared, followed by drying and subsequently pressing the current collector coated with the slurry so as to prepare a negative electrode.

<Preparation of Electrode Group>

An electrode group was prepared by laminating the positive electrode referred to above, a separator formed of a polyethylene porous film, the negative electrode referred to above, and another separator formed of a polyethylene porous film in the order mentioned so as to obtain a laminate structure, followed by spirally winding the laminate structure thus obtained such that the negative electrode was positioned to constitute the outermost circumferential layer.

<Preparation of Liquid Nonaqueous Electrolyte>

A nonaqueous solvent was prepared by mixing a first solvent of ethylene carbonate (EC) with a second solvent of diethyl carbonate (DEC) at a mixing ratio by volume of 1:6. The content of the first solvent in the nonaqueous solvent was 14% by volume, with the content of the second solvent in the nonaqueous solvent being 86% by volume. Then, a liquid nonaqueous electrolyte was prepared by dissolving lithium hexafluoro phosphate ($LiPF_6$) in the nonaqueous solvent thus prepared at a concentration of 2 mol/L.

Then, the electrode group and the liquid nonaqueous electrolyte referred above were housed in a cylindrical case made of stainless steel so as to assemble a cylindrical nonaqueous electrolyte secondary battery constructed as shown in FIG. 1.

EXAMPLE 34

In the first step, LiOH and (Ni, Co, Al)(OH)$_2$ were mixed so as to prepare a composition shown in Table 5. The resultant mixture was calcined at 750° C. for 24 hours under an oxygen gas stream. The calcined material was pulverized, followed by calcining again the pulverized material under the similar conditions. The pulverizing step and the re-calcining step were repeated 2 times so as to obtain a lithium nickel cobalt aluminum complex oxide having a composition shown in Table 5. The complex oxide thus obtained was used as a positive electrode active material.

The pH value of the positive electrode active material thus obtained was measured as in Example 33, with the result as shown in Table 5.

Finally, a cylindrical nonaqueous electrolyte secondary battery was assembled as in Example 33, except that used was the positive electrode active material referred to above.

EXAMPLE 35

In the first step, LiOH and (Ni, Co, Nb)(OH)$_2$ were mixed so as to prepare a composition shown in Table 5. The resultant mixture was calcined at 750° C. for 24 hours under an oxygen gas stream. The calcined material was pulverized, followed by calcining again the pulverized material under the similar conditions. The pulverizing step and the re-calcining step were repeated 2 times so as to obtain a lithium nickel cobalt niobium complex oxide having a composition shown in Table 5. The complex oxide thus obtained was used as a positive electrode active material.

The pH value of the positive electrode active material thus obtained was measured as in Example 33, with the result as shown in Table 5.

Finally, a cylindrical nonaqueous electrolyte secondary battery was assembled as in Example 33, except that used was the positive electrode active material referred to above.

EXAMPLE 36

In the first step, LiOH and (Ni, Co, Mn)(OH)$_2$ were mixed so as to prepare a composition shown in Table 5. The resultant mixture was calcined at 750° C. for 24 hours under an oxygen gas stream. The calcined material was pulverized, followed by calcining again the pulverized material under the similar conditions. The pulverizing step and the re-calcining step were repeated 3 times so as to obtain a lithium nickel cobalt manganese complex oxide having a composition shown in Table 5. The complex oxide thus obtained was used as a positive electrode active material.

The pH value of the positive electrode active material thus obtained was measured as in Example 33, with the result as shown in Table 5.

Finally, a cylindrical nonaqueous electrolyte secondary battery was assembled as in Example 33, except that used was the positive electrode active material referred to above.

EXAMPLE 37

In the first step, LiOH and (Ni, Co, Mn)(OH)$_2$ were mixed so as to prepare a composition shown in Table 5. The resultant mixture was calcined at 750° C. for 24 hours under an oxygen gas stream. The calcined material was pulverized, followed by calcining again the pulverized material under the similar conditions. The pulverizing step and the re-calcining step were repeated 3 times so as to obtain a lithium nickel cobalt manganese complex oxide having a composition shown in Table 5. The complex oxide thus obtained was used as a positive electrode active material.

The pH value of the positive electrode active material thus obtained was measured as in Example 33, with the result as shown in Table 5.

Finally, a cylindrical nonaqueous electrolyte secondary battery was assembled as in Example 33, except that used was the positive electrode active material referred to above.

EXAMPLE 38

In the first step, LiOH and (Ni, Co, Mn)(OH)$_2$ were mixed so as to prepare a composition shown in Table 5. The resultant mixture was calcined at 750° C. for 24 hours under an oxygen gas stream. The calcined material was pulverized, followed by calcining again the pulverized material under the similar conditions. The pulverizing step and the re-calcining step were repeated 3 times so as to obtain a lithium nickel cobalt manganese complex oxide having a composition shown in Table 5. The complex oxide thus obtained was used as a positive electrode active material.

The pH value of the positive electrode active material thus obtained was measured as in Example 33, with the result as shown in Table 5.

Finally, a cylindrical nonaqueous electrolyte secondary battery was assembled as in Example 33, except that used was the positive electrode active material referred to above.

EXAMPLE 39

A cylindrical nonaqueous electrolyte secondary battery was assembled as in Example 33, except that used as the positive electrode active material was a powdery $LiCoO_2$.

EXAMPLE 40

A cylindrical nonaqueous electrolyte secondary battery was assembled as in Example 33, except that used as the positive electrode active material was a powdery $LiMn_2O_4$.

COMPARATIVE EXAMPLE 8

A cylindrical nonaqueous electrolyte secondary battery was assembled as in Example 39, except that used as the negative electrode active material was a mesophase pitch based carbon fiber, which was subjected to a heat treatment at 3,000° C., having a fiber diameter of 8 µm, an average fiber length of 20 µm, an average interplanar spacing ($d_{002}$) of 0.336 nm.

COMPARATIVE EXAMPLE 9

A cylindrical nonaqueous electrolyte secondary battery was assembled as in Example 33, except that used as the negative electrode active material was a mesophase pitch based carbon fiber, which was subjected to a heat treatment at 3,000° C., having a fiber diameter of 8 µm, an average fiber length of 20 µm, an average interplanar spacing ($d_{002}$) of 0.336 nm.

COMPARATIVE EXAMPLE 10

A cylindrical nonaqueous electrolyte secondary battery was assembled as in Example 36, except that used as the negative electrode active material was a mesophase pitch based carbon fiber, which was subjected to a heat treatment at 3,000° C., having a fiber diameter of 8 µm, an average fiber length of 20 µm, an average interplanar spacing ($d_{002}$) of 0.336 nm.

Measured was a charge-discharge capacity retention rate after 200 cycles in the case where the charging rate in the constant current charging was changed within a range of between 1 and 4 CmA in respect of the secondary battery prepared in each of Examples 33 to 40.

Specifically, a constant current charging was performed under a constant current of 1 CmA and, when the battery voltage reached 2.8V, a constant voltage charging was performed at 2.8V. The total charging time of the constant current charging and the constant voltage charging was set at 3 hours. After the charging, the secondary battery was discharged under a current of 1 CmA. The charge-discharge cycle was repeated in this fashion so as to measure the capacity retention rate after 200 cycles, with the result as shown in Table 5. Incidentally, the discharge capacity in the 200-th cycle with the discharge capacity in the first cycle set at 100% was given in Table 5 as the capacity retention rate after 200 cycles.

Then, measured was the capacity retention rate after 200 cycles under 2 CmA as in the case where the charging rate was set at 1 CmA, except that the charging rate in the constant current charging was changed to 2 CmA and that the total charging time of the constant current charging and the constant voltage charging was changed to 45 minutes, with the result as shown in Table 5.

Also, measured was the capacity retention rate after 200 cycles under 3 CmA as in the case where the charging rate was set at 1 CmA, except that the charging rate in the constant current charging was changed to 3 CmA and that the total charging time of the constant current charging and the constant voltage charging was changed to 30 minutes, with the result as shown in Table 5.

Further, measured was the capacity retention rate after 200 cycles under 4 CmA as in the case where the charging rate was set at 1 CmA, except that the charging rate in the constant current charging was changed to 4 CmA and that the total charging time of the constant current charging and the constant voltage charging was changed to 20 minutes, with the result as shown in Table 5.

Incidentally, in respect of the secondary for each of Comparative Examples 8 to 10, measured was the charge-discharge retention rate after 200 cycles as in Examples 33 to 40, except that the voltage for the constant voltage charging was changed to 4.2V.

TABLE 5

| | Negative electrode active material | Positive electrode active material | | Discharge capacity rate after 200 cycles at 1 CmA (%) | Discharge capacity rate after 200 cycles at 2 CmA (%) | Discharge capacity rate after 200 cycles at 3 CmA (%) | Discharge capacity rate after 200 cycles at 4 CmA (%) |
|---|---|---|---|---|---|---|---|
| | | Composition | pH | | | | |
| Example 33 | $Fe_9S_{10}$ | $LiNi_{0.75}Co_{0.2}Al_{0.05}O_2$ | 10.9 | 94 | 90 | 88 | 88 |
| Example 34 | $Fe_9S_{10}$ | $LiNi_{0.75}Co_{0.15}Al_{0.1}O_2$ | 11.0 | 94 | 89 | 88 | 87 |
| Example 35 | $Fe_9S_{10}$ | $LiNi_{0.75}Co_{0.2}Nb_{0.05}O_2$ | 11.2 | 93 | 88 | 87 | 86 |
| Example 36 | $Fe_9S_{10}$ | $LiNi_{0.6}Co_{0.3}Mn_{0.1}O_2$ | 10.9 | 95 | 94 | 93 | 92 |
| Example 37 | $Fe_9S_{10}$ | $LiNi_{0.5}Co_{0.4}Mn_{0.1}O_2$ | 10.9 | 94 | 93 | 92 | 90 |
| Example 38 | $Fe_9S_{10}$ | $LiNi_{0.6}Co_{0.2}Mn_{0.2}O_2$ | 10.8 | 94 | 93 | 92 | 90 |
| Example 39 | $Fe_9S_{10}$ | $LiCoO_2$ | — | 95 | 82 | 78 | 68 |
| Example 40 | $Fe_9S_{10}$ | $LiMn_2O_4$ | — | 95 | 72 | 65 | 50 |
| Comparative Example 8 | C (carbonaceous material) | $LiCoO_2$ | — | 95 | 70 | 40 | 20 |
| Comparative Example 9 | C (carbonaceous material) | $LiNi_{0.75}Co_{0.2}Al_{0.05}O_2$ | 10.9 | 95 | 72 | 45 | 30 |
| Comparative Example 10 | C (carbonaceous material) | $LiNi_{0.6}Co_{0.3}Mn_{0.1}O_2$ | 10.9 | 95 | 72 | 45 | 30 |

As apparent from Table 5, it was possible to suppress the reduction in the cycle life in the case where the constant current charging rate was changed to 1 CmA, 2 CmA, 3 CmA and 4 CmA in the secondary battery for each of Examples 33 to 40.

On the other hand, the secondary batteries for Comparative Examples 8 to 10 were substantially equal to the secondary batteries for Examples 33 to 40 in the cycle life under the constant current charging rate of 1 CmA. However, if the charging rate was increased to 3 CmA, the cycle life was rendered markedly short in the secondary batteries for Comparative Examples 8 to 10. It is considered reasonable to understand that, since the difference between the lithium absorption potential of the negative electrode containing a carbonaceous material and the Li/Li$^+$ potential is small, the metal lithium was precipitated on the surface of the negative electrode in the case of performing a rapid charging, with the result that the precipitated metal lithium performed a reaction with the nonaqueous electrolyte so as to bring about the deterioration in the capacity.

Figure 5:
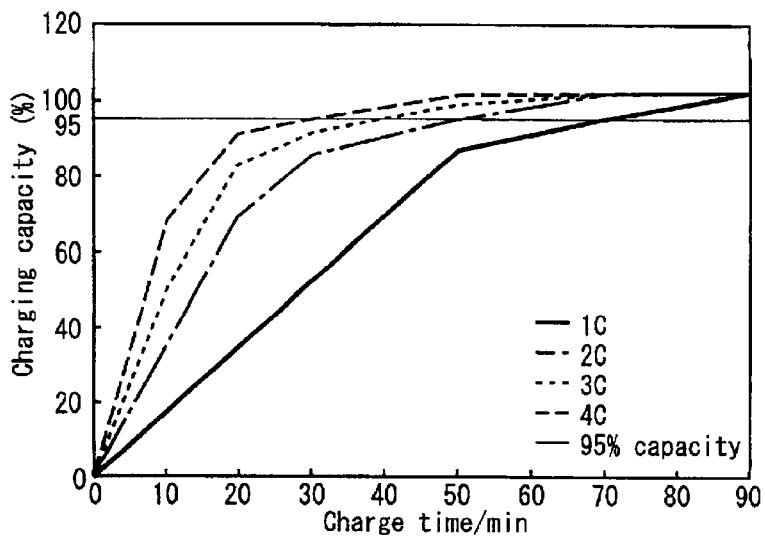
FIG. 5 is a graph showing the changes in the charged capacity in the initial period of 90 minutes in the charging under a constant current and a constant voltage in respect of the nonaqueous electrolyte secondary battery for Example 33 of the present invention.
Figure 6:
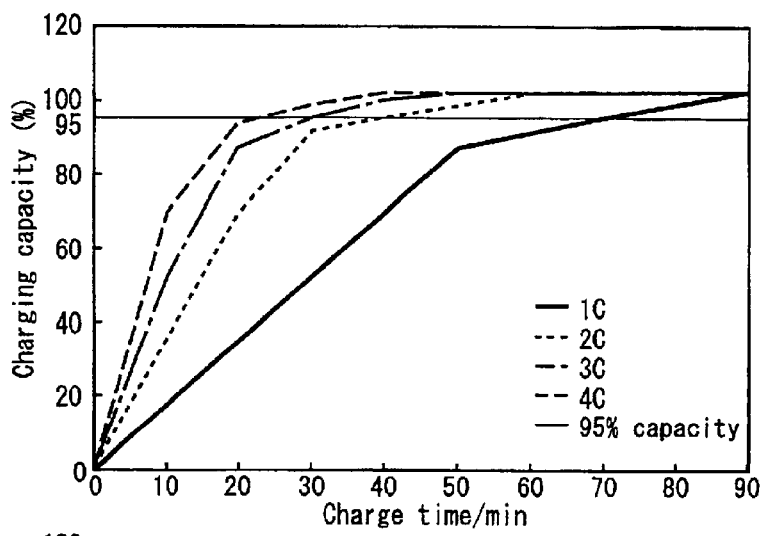
FIG. 6 is a graph showing the changes in the charged capacity in the initial period of 90 minutes in the charging under a constant current and a constant voltage in respect of the nonaqueous electrolyte secondary battery for Example 36 of the present invention.
Figure 7:
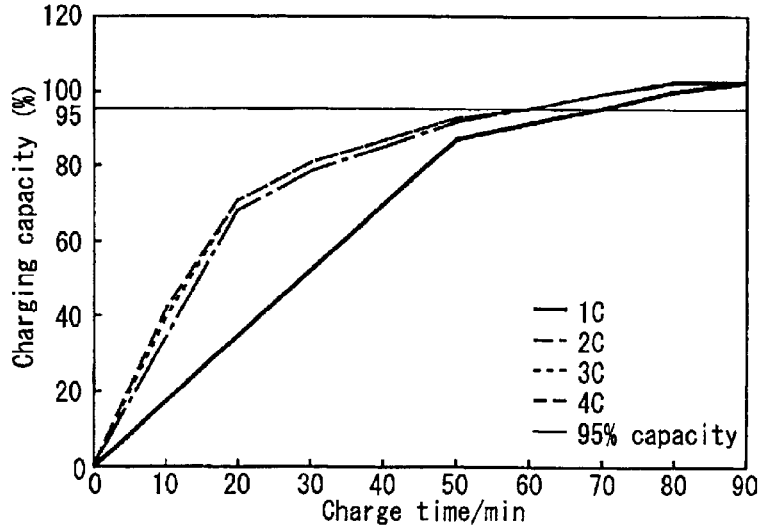
FIG. 7 is a graph showing the changes in the charged capacity in the initial period of 90 minutes in the charging under a constant current and a constant voltage in respect of the nonaqueous electrolyte secondary battery for Example 39 of the present invention.

A constant current charging was applied to the secondary battery for Example 33 at 1 CmA and, when the battery voltage reached 2.8V, a constant voltage charging was applied to the battery. FIG. 5 is a graph showing the changes in the charging capacity for the initial 90 minutes in the constant current-constant voltage charging. Plotted in the graph of FIG. 5 were the changes in the charging capacity, covering the cases where the constant current charging rate was changed to 2 CmA, 3 CmA, and 4 CmA. Changes in the charging capacities in the case of changing the constant current charging rate were also measured for the secondary batteries for Examples 36 and 37. FIGS. 6 and 7 are graphs showing the result for Example 36 and the result for Example 37, respectively.

As apparent from FIG. 5, the secondary battery for Example 33 was found to be capable of shortening the charging time required for the charging capacity to reach 95% with increase in the charging rate in the constant current charging. To be more specific, in the charging at 1C, the charging time required for the charging capacity to reach 95% was about 70 minutes. On the other hand, the charging time required for the charging capacity to reach 95% was 50 minutes in the rapid charging at 2C, 40 minutes in the rapid charging at 3C, and only 30 minutes in the rapid charging at 4C.

Also, when it comes to the secondary battery for Example 36, the experimental data given in FIG. 6 indicate that it is possible to shorten the charging time required for the charging capacity to reach 95% with increase in the charging rate under a constant current charging. To be more specific, in the charging at 1C, the charging time required for the charging capacity to reach 95% was about 70 minutes. On the other hand, the charging time required for the charging capacity to reach 95% was 40 minutes in the rapid charging at 2C, 32 minutes in the rapid charging at 3C, and only 20 minutes in the rapid charging at 4C.

On the other hand, the experimental data given in FIG. 7 indicate that, when it comes to the secondary battery for Example 39, it was possible to shorten the charging time required for the charging capacity to reach 95% when the constant current charging rate was set at 2C, compared with the case where the constant current charging rate was set at 1C. To be more specific, it was found possible to shorten the charging time required for the charging capacity to reach 95% to 60 minutes in the rapid charging at 2C, though the charging time in question was 70 minutes in the charging at 1C. However, the rapid charging at 3C and the rapid charging at 4C were found to be substantially equal to the rapid charging at 2C in the charging time required for the charging capacity to reach 95%.

EXAMPLE 41

<Preparation of Positive Electrode>

A slurry was prepared by mixing 91 parts by weight of a powder lithium cobalt oxide (LiCoO$_2$) used as a positive electrode active material, 2.5 parts by weight of acetylene black used as a conductive agent, 3 parts by weight of graphite used as a conductive agent, and 4 parts by weight of polyvinylidene fluoride (PVdF) used as a binder within an N-methyl pyrrolidone (NMP) solution. Then, a current collector formed of an aluminum foil having a thickness of 15 $\mu$m was coated with the slurry thus prepared, followed by drying and subsequently pressing the current collector coated with the slurry so as to prepare a positive electrode having an electrode density of 3.0 g/cm$^3$.

<Preparation of Negative Electrode>

A slurry was prepared by mixing 85 parts by weight of a powder (Fe$_{0.97}$Cu$_{0.03}$)$_9$S$_{10}$ having an average particle diameter of 10 $\mu$m and used as a negative electrode active material, 3 parts by weight of acetylene black used as a conductive agent, 5 parts by weight of graphite used as a conductive agent, and 7 parts by weight of PVdF used as a binder within an N-methyl pyrrolidone (NMP) solution. Then, a current collector formed of an aluminum foil having a thickness of 15 $\mu$m was coated with the slurry thus prepared, followed by drying and subsequently pressing the current collector coated with the slurry so as to prepare a negative electrode.

<Preparation of Electrode Group>

An electrode group was prepared by laminating the positive electrode referred to above, a separator formed of a polyethylene porous film, the negative electrode referred to above, and another separator formed of a polyethylene porous film in the order mentioned so as to obtain a laminate structure, followed by spirally winding the laminate structure thus obtained such that the negative electrode was positioned to constitute the outermost circumferential layer.

<Preparation of Liquid Nonaqueous Electrolyte>

Ethylene carbonate (EC) was mixed with ethyl methyl carbonate (EMC) at a mixing ratio by volume of 1:2 so as to obtain a nonaqueous solvent. Then, lithium hexafluoro phosphate (LiPF$_6$) was dissolved in the resultant nonaqueous solvent at a concentration of 1 mol/L so as to obtain a liquid nonaqueous electrolyte.

Then, the electrode group and the liquid nonaqueous electrolyte referred to above were housed in a cylindrical case made of stainless steel so as to assemble a cylindrical nonaqueous electrolyte battery constructed as shown in FIG. 1.

EXAMPLES 42 TO 54 AND COMPARATIVE EXAMPLES 11 TO 15

A cylindrical nonaqueous electrolyte battery was assembled as in Example 41, except that the sulfides having the compositions shown in Tables 6 and 7 were used as the negative electrode active material.

Incidentally, shown in each of Tables 6 and 7 are the composition in which the total molar ratio of Fe and the element M and the molar ratio of S are indicated by integers, and the composition conforming with the expression of formula (4), i.e., the expression of $\{A_zFe_{1-x}M_xS_y\}$.

A charge-discharge cycle test was applied to the secondary battery for each of Examples 41 to 54 and Comparative Examples 11 to 15 such that the battery was charged for 3 hours at 0.5 CmA to reach 2.8V, followed by discharging the secondary battery at 0.5 CmA to reach 1.5V so as to measure the discharge capacity for the first cycle and the cycle life, with the result as shown in Tables 6 and 7. Incidentally, the number of cycles up to the time when the discharge capacity was lowered to 80% of the reference capacity, i.e., the discharge capacity at the first cycle, is indicated in Tables 6 and 7 as the cycle life.

Also, the diffraction angle 2θ of the peak having the highest intensity was measured by the X-ray diffraction using CuKα as the X-ray source in respect of the negative electrode active material for each of Examples 41 to 54 and Comparative Examples 11 to 15, with the result as shown in Tables 6 and 7. Also, FIG. 8 shows an X-ray diffraction pattern using a CuKα as an X-ray source in respect of the negative electrode active material for Example 41, and FIG. 9 shows an X-ray diffraction pattern using a CuKα as an X-ray source in respect of the negative electrode active material for Example 54.

Figure 8:
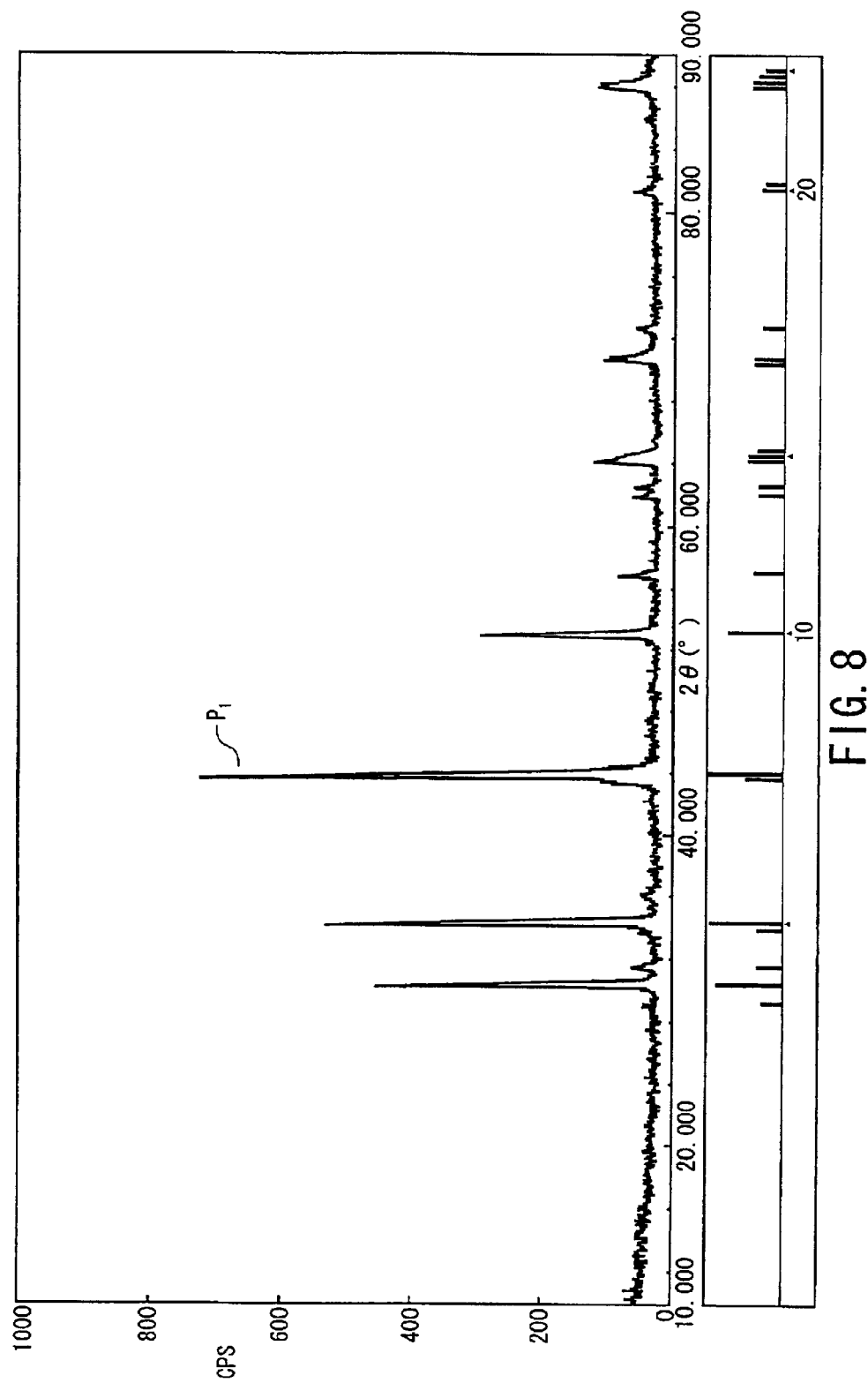
FIG. 8 shows the X-ray diffraction pattern using CuKα as the X-ray source in respect of the negative electrode active material for Example 41 of the present invention.
Figure 9:
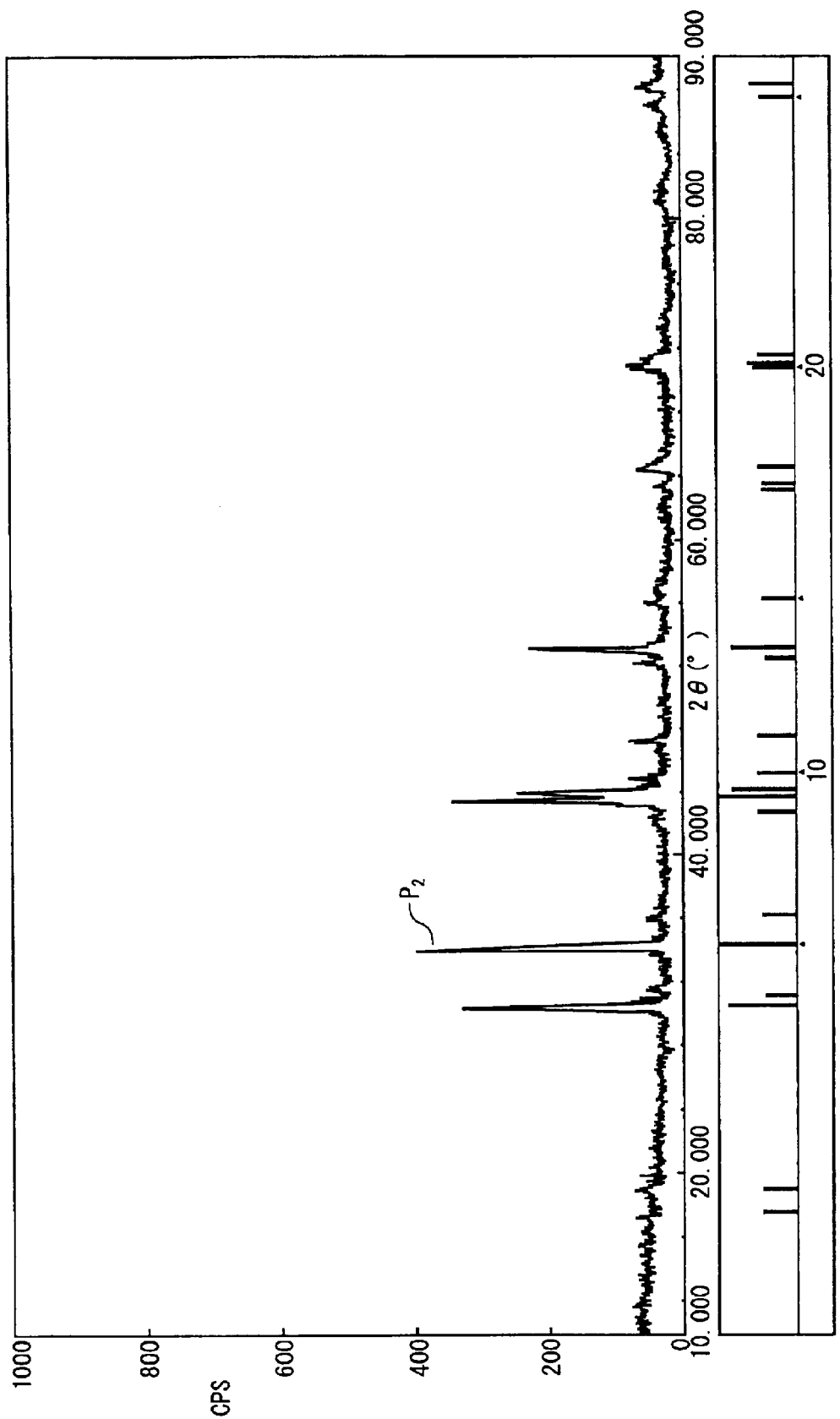
FIG. 9 shows the X-ray diffraction pattern using CuKα as the X-ray source in respect of the negative electrode active material for Example 54 of the present invention.

As apparent from FIG. 8, in the negative electrode active material for Example 41, a peak $P_1$ having the highest intensity appears at the diffraction angle 2θ of 43.9° in the X-ray diffraction using a CuKα as the X-ray source. On the other hand, FIG. 9 shows that, in the negative electrode active material for Example 54, a peak $P_2$ having the highest intensity appears at the diffraction angle 2θ of 33.7° in the X-ray diffraction using a CuKα as the X-ray source.

Also, as apparent from the comparison between the secondary batteries using the negative electrode active materials of the same composition, i.e., the comparison between the secondary battery for Example 41 and the secondary battery for Example 54, the secondary battery for Example 41, in which the diffraction angle 2θ of the peak having the highest intensity appears within a range of between 43.6° and 44.1° in the X-ray diffraction using CuKα as the X-ray source, exhibits a longer life.

Incidentally, if P is contained in the negative electrode active material for each of Examples 41 to 54, the cycle characteristics are certainly lowered. However, it is possible to increase the battery capacity.

EXAMPLE 55

<Preparation of Positive Electrode>

A slurry was prepared by mixing 91 parts by weight of a powder lithium cobalt oxide ($LiCoO_2$) used as a positive

TABLE 6

| | Composition of negative electrode active material | Discharge capacity (mAh) | Cycle life (number of times) | 2θ (°) |
|---|---|---|---|---|
| Example 41 | $(Fe_{0.97}Cu_{0.03})_9S_{10}$ [$(Fe_{0.97}Cu_{0.03})S_{1.11}$] | 1200 | 530 | 43.9 |
| Example 42 | $(Fe_{0.99}Cu_{0.01})_9S_{10}$ [$(Fe_{0.99}Cu_{0.01})S_{1.11}$] | 1250 | 500 | 43.8 |
| Example 43 | $(Fe_{0.999}Cu_{0.001})_9S_{10}$ [$(Fe_{0.999}Cu_{0.001})S_{1.11}$] | 1300 | 485 | 43.7 |
| Example 44 | $(Fe_{0.97}Ni_{0.03})_{10}S_{11}$ [$(Fe_{0.97}Ni_{0.03})S_{1.1}$] | 1200 | 510 | 44.1 |
| Example 45 | $(Fe_{0.997}Cr_{0.003})_{11}S_{12}$ [$(Fe_{0.997}Cr_{0.003})S_{1.09}$] | 1200 | 500 | 43.9 |
| Example 46 | $(Fe_{0.999}Cu_{0.001})_3S_4$ [$(Fe_{0.999}Cu_{0.001})S_{1.33}$] | 1300 | 485 | 43.8 |
| Example 47 | $Li_{0.01}(Fe_{0.99}Cu_{0.01})_9S_{10}$ [$Li_{0.01}(Fe_{0.99}Cu_{0.01})S_{1.11}$] | 1250 | 550 | 44.0 |
| Example 48 | $Li(Fe_{0.99}Cu_{0.01})_9S_{10}$ [$Li(Fe_{0.99}Cu_{0.01})S_{1.11}$] | 1300 | 600 | 44.0 |
| Example 49 | $(Fe_{0.99}Co_{0.01})_9S_{10}$ [$(Fe_{0.99}Co_{0.01})S_{1.11}$] | 1250 | 500 | 43.8 |
| Example 50 | $(Fe_{0.99}Mn_{0.01})_9S_{10}$ [$(Fe_{0.99}Mn_{0.01})S_{1.11}$] | 1150 | 525 | 43.8 |

TABLE 7

| | Composition of negative electrode active material | Discharge capacity (mAh) | Cycle life (number of times) | 2θ (°) |
|---|---|---|---|---|
| Example 51 | $(Fe_{0.99}Mg_{0.01})_9S_{10}$ [$(Fe_{0.99}Mg_{0.01})S_{1.11}$] | 1150 | 485 | 43.6 |
| Example 52 | $(Fe_{0.99}Al_{0.01})_9S_{10}$ [$(Fe_{0.99}Al_{0.01})S_{1.11}$] | 1150 | 485 | 43.7 |
| Example 53 | $(Fe_{0.99}Si_{0.01})_9S_{10}$ [$(Fe_{0.99}Si_{0.01})S_{1.11}$] | 1250 | 470 | 43.7 |
| Example 54 | $(Fe_{0.97}Cu_{0.03})_9S_{10}$ [$(Fe_{0.97}Cu_{0.03})S_{1.11}$] | 1200 | 450 | 33.7 |
| Comparative Example 11 | $FeS_2$ | 1600 | 20 | 56.4 |
| Comparative Example 12 | $(Fe_{0.99}Cu_{0.01})S_2$ | 1500 | 60 | 56.6 |
| Comparative Example 13 | $(Fe_{0.95}Cu_{0.05})S_2$ | 1400 | 40 | 56.8 |
| Comparative Example 14 | $Fe_9S_{10}$ | 1300 | 300 | 43.5 |
| Comparative Example 15 | $(Fe_{0.95}Cu_{0.05})_9S_{10}$ | 1000 | 350 | 44.5 |

As apparent from Tables 6 and 7, the secondary batteries for Examples 41 to 54, in which a sulfide represented by formula (4) given previously, i.e., the formula of $A_zFe_{(1-x)}M_xS_y$, was used as the negative electrode active material, were found to be superior in the cycle life to the secondary batteries for Comparative Examples 11 to 15. Particularly, the secondary batteries for Examples 47 and 48, in which a sulfide represented by formula (4b) given previously, i.e., the formula of $A_zFe_{(1-x)}M_xS_y$, was used as the negative electrode active material, were found to be superior in the cycle life to the secondary batteries for Examples 41 to 46 and 49 to 54.

electrode active material, 2.5 parts by weight of acetylene black used as a conductive agent, 3 parts by weight of graphite used as a conductive agent, and 4 parts by weight of polyvinylidene fluoride (PVdF) used as a binder within an N-methyl pyrrolidone (NMP) solution. Then, a current collector formed of an aluminum foil having a thickness of 15 μm was coated with the slurry thus prepared, followed by drying and subsequently pressing the current collector coated with the slurry so as to prepare a positive electrode having an electrode density of 3.0 g/cm³.

<Preparation of Negative Electrode>

Fe, P and S used as the raw materials of the negative electrode active material were mixed at an atomic equivalent ratio of 1:1:3, and the resultant mixture was sealed in a quartz tube, followed by applying a heat treatment to mixture at 700° C. for one week so as to obtain FePS$_3$. The resultant compound thus obtained was pulverized by using a lapis lazuli mortar so as to obtain a powder having an average particle diameter of 20 µm.

Then, a slurry was prepared by mixing 85 parts by weight of a powdery FePS$_3$ used as a negative electrode active material, 5 parts by weight of graphite used as a conductive agent, 3 parts by weight of acetylene black used as a conductive agent, and 7 parts by weight of PVdF used as a binder within an N-methyl pyrrolidone (NMP) solution. Then, a current collector formed of an aluminum foil having a thickness of 15 µm was coated with the slurry thus prepared, followed by drying and subsequently pressing the current collector coated with the slurry so as to prepare a negative electrode.

<Preparation of Electrode Group>

An electrode group was prepared by laminating the positive electrode referred to above, a separator formed of a polyethylene porous film, the negative electrode referred to above, and another separator formed of a polyethylene porous film in the order mentioned so as to obtain a laminate structure, followed by spirally winding the laminate structure thus obtained such that the negative electrode was positioned to constitute the outermost circumferential layer.

<Preparation of Liquid Nonaqueous Electrolyte>

Ethylene carbonate (EC), ethyl methyl carbonate (EMC) and diethyl carbonate (DEC) were mixed with each other at a mixing ratio by volume of 1:1:1 so as to obtain a nonaqueous solvent. Then, LiPF$_6$ was dissolved in the resultant nonaqueous solvent at a concentration of 1 mol/L and LiN(C$_2$F$_5$SO$_2$)$_2$ was also dissolved in the nonaqueous solvent at a concentration of 1 mol/L so as to obtain a liquid nonaqueous electrolyte.

Then, the electrode group and the liquid nonaqueous electrolyte referred to above were housed in a cylindrical case made of stainless steel so as to assemble a cylindrical nonaqueous electrolyte battery constructed as shown in FIG. 1.

EXAMPLES 56 TO 75 AND COMPARATIVE EXAMPLES 16 TO 19

A cylindrical nonaqueous electrolyte battery was assembled as in Example 55, except that the sulfide having a composition shown in Table 8 was used as the negative electrode active material.

The secondary battery for each of Examples 55 to 75 and Comparative Examples 16 to 19 was charged at 0.5 CmA for 3 hours to reach 3 to 3.5V, followed by discharging the secondary battery at 0.5 CmA to reach 1V so as to measure the discharge capacity, and the average battery voltage and the energy density were calculated. Table 8 shows the result.

TABLE 8

|  | Negative electrode active material | Average voltage (V) | Energy density (Wh/kg) |
| --- | --- | --- | --- |
| Example 55 | FePS$_3$ | 2.6 | 403 |
| Example 56 | NiPS$_3$ | 2.5 | 382 |
| Example 57 | CoPS$_3$ | 2.4 | 369 |
| Example 58 | MnPS$_3$ | 3.2 | 401 |
| Example 59 | CuPS$_3$ | 2.3 | 340 |
| Example 60 | KFePS$_3$ | 2.7 | 418 |

TABLE 8-continued

|  | Negative electrode active material | Average voltage (V) | Energy density (Wh/kg) |
| --- | --- | --- | --- |
| Example 61 | NaFePS$_3$ | 2.7 | 410 |
| Example 62 | KNiPS$_3$ | 2.5 | 386 |
| Example 63 | NaNiPS$_3$ | 2.5 | 384 |
| Example 64 | LiNiPS$_3$ | 2.5 | 390 |
| Example 65 | Li$_2$CoPS$_3$ | 2.5 | 380 |
| Example 66 | Li$_3$FePS$_3$ | 2.7 | 431 |
| Example 67 | LiKFePS$_3$ | 2.7 | 422 |
| Example 68 | LiNaFePS$_3$ | 2.7 | 420 |
| Example 69 | FePS | 2.5 | 350 |
| Example 70 | FeP$_{0.5}$S | 2.4 | 323 |
| Example 71 | FeP$_{0.1}$S | 2.3 | 302 |
| Example 72 | FeP$_{0.01}$S | 2.05 | 219 |
| Example 73 | FeP$_{0.05}$S | 2.1 | 236 |
| Example 74 | FeP$_2$ S | 2.5 | 280 |
| Example 75 | FeP$_3$ S | 2.5 | 250 |
| Comparative Example 16 | FeS | 2.0 | 201 |
| Comparative Example 17 | NiS | 1.8 | 180 |
| Comparative Example 18 | CuS | 1.6 | 160 |
| Comparative Example 19 | CoS | 2.0 | 196 |

The secondary battery for each of Examples 55 to 75 comprises as a negative electrode active material a complex sulfide compound containing at least one kind of the metal element M1 selected from the group consisting of Fe, Ni, Co, Mn and Cu and an additional element P.

As apparent from Table 8, the secondary battery for each of Examples 55 to 75 is superior to the secondary battery for each of Comparative Examples 16 to 19 in the energy density.

Also, the comparison among Examples 69 to 75 indicates that the battery voltage can be increased with increase in the molar ratio of P in the sulfide. On the other hand, it is desirable for the molar ratio of P to be low for improving the cycle life. It follows that, in order to obtain both a high energy density and a long cycle life, it is desirable for the molar ratio b of P to fall within a range of between 0.9 and 1.1 on the basis that the molar ratio of the metal element M1 selected from the group consisting of Fe, Ni, Co, Mn and Cu is set at 1.

It is also seen that the secondary battery for each of Examples 64 to 68, which comprises as a negative electrode active material a complex sulfur compound containing the metal element M1, P and an alkali metal, is high in the battery voltage and in the energy density.

As described above in detail, the present invention provides a nonaqueous electrolyte battery exhibiting an improved cycle life, and a negative electrode active material capable of exhibiting an improved cycle life. Also, the present invention provides a nonaqueous electrolyte battery exhibiting an improved energy density, and a negative electrode active material capable of exhibiting an improved energy density.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery, comprising:

a positive electrode containing a positive electrode active material;

a negative electrode containing a sulfide containing Fe; and a nonaqueous electrolyte including a nonaqueous solvent and a solute dissolved in said nonaqueous solvent, said nonaqueous solvent containing a first solvent containing a cyclic carbonate and a second solvent containing a chain carbonate;

wherein the content of said first solvent in said nonaqueous solvent falls within a range of between 4.8 and 29% by volume and the content of said second solvent in said nonaqueous solvent falls within a range of between 71 and 95.2% by volume.

2. The nonaqueous electrolyte battery according to claim 1, wherein the mixing ratio of said first solvent to said second solvent satisfies formula (1):

$$S_1:S_2 = 1:2.5 \text{ to } 1:20 \tag{1}$$

where $S_1$ represents the mixing amount by volume of said first solvent, and $S_2$ represents the mixing amount by volume of said second solvent.

3. The nonaqueous electrolyte battery according to claim 2, wherein said ratio $S_1:S_2$ falls within a range of between 1:4 and 1:6.

4. The nonaqueous electrolyte battery according to claim 1, wherein said cyclic carbonate is selected from the group consisting of ethylene carbonate (EC), propylene carbonate (PC), and a mixture of EC and PC.

5. The nonaqueous electrolyte battery according to claim 1, wherein said chain carbonate is selected from the group consisting of diethyl carbonate (DEC) and a mixture of DEC and ethyl methyl carbonate (EMC).

6. The nonaqueous electrolyte battery according to claim 1, wherein said solute contains a first lithium salt having a composition represented by formula (2) and at least one kind of a second lithium salt selected from the group consisting of $LiPF_6$, $LiBF_4$, $LiClO_2$ and $LiCF_3SO_3$:

$$LiN(Q_1SO_2)(Q_2SO_2) \tag{2}$$

where $Q_1$ represents $C_mF_{2m}+1$ ($m=1$ to 4), and $Q_2$ represents $C_nF_{2n}+1$ ($n=1$ to 4).

7. The nonaqueous electrolyte battery according to claim 1, wherein said positive electrode active material contains an oxide having a composition represented by formula (3):

$$Li_{(1+s)}Ni_{(1-t-u)}Co_tT_uO_2 \tag{3}$$

where T is at least one kind of an element selected from the transition metal elements other than Ni and Co, the molar amount s falls within a range of between 0 and 0.2, i.e., $0 \leq s \leq 0.2$, the molar amount t falls within a range of between 0.1 and 0.4, i.e., $0.1 \leq t \leq 0.4$, and the molar amount u falls within a range of between 0.01 and 0.2, i.e., $0.01 \leq u \leq 0.2$.

8. The nonaqueous electrolyte battery according to claim 7, wherein said oxide has a pH value falling within a range of between 10.5 and 12.

9. The nonaqueous electrolyte battery according to claim 1, wherein said sulfide containing Fe has a composition represented by formula (4):

$$A_2Fe_{(1-x)}M_xS_y \tag{4}$$

where "A" contains at least one kind of an alkali metal, "M" contains at least one element selected from the group consisting of Cu, Ni, Go, Mn, Mg, Al, Si and Cr, the molar amount x falls within a range of between 0.0003 and 0.03, i.e., $0.0003 \leq x \leq 0.03$, the molar amount y falls within a range of between 1.08 and 1.33, i.e., $1.08 \leq y \leq 1.33$, and the molar amount z is not higher than 2, i.e., $0 \leq z \leq 2$.

10. The nonaqueous electrolyte battery according to claim 1, wherein said sulfide containing Fe further contains P.

11. The nonaqueous electrolyte battery according to claim 1, wherein said sulfide containing Fe has a composition represented by formula (5):

$$A_aM1P_bS_c \tag{5}$$

where "A" contains at least one kind of an alkali metal element, "M1" contains the molar amount "a" falls within a range of between 0 and 12, i.e., $0 \leq a \leq 12$, the molar amount "b" falls within a range of between 0.1 and 1.1, i.e., $0.1 \leq b \leq 1.1$, and the molar amount "c" falls within a range of between 0.9 and 3.3, i.e., $0.9 \leq c \leq 3.3$.

12. A nonaqueous electrolyte battery, comprising:

a positive electrode containing a positive electrode active material;

a negative electrode containing a sulfide containing Fe; and a nonaqueous electrolyte including a nonaqueous solvent, said nonaqueous solvent comprising a first solvent containing a cyclic carbonate and a second solvent containing a chain carbonate, and a solute dissolved in said nonaqueous solvent, the mixing ratio of said first solvent to said second solvent satisfying formula (1):

$$S_1:S_2 = 1:2.5 \text{ to } 1:20 \tag{1}$$

where $S_1$ represents the mixing amount by volume of said first solvent, and $S_2$ represents the mixing amount by volume of said second solvent.

13. The nonaqueous electrolyte battery according to claim 12, wherein said ratio $S_1:S_2$ falls within a range of between 1:4 and 1:6.

14. A negative electrode active material capable of absorbing-desorbing an alkali metal, said negative electrode active material containing a compound having a composition represented by formula (4):

$$A_zFe_{(1-x)}M_xS_y \tag{4}$$

where "A" contains at least one kind of an alkali metal, "M" contains at least one element selected from the group consisting of Cu, Ni, Co, Mn, Mg, Al, Si and Cr, the molar amount x falls within a range of between 0.0003 and 0.03, i.e., $0.0003 \leq x \leq 0.03$, the molar amount y falls within a range of between 1.08 and 1.33, i.e., $1.08 \leq y \leq 1.33$, and the molar amount z is not higher than 2, i.e., $0 \leq z \leq 2$.

15. The negative electrode active material according to claim 14, wherein said compound has a diffraction angle 2θ, where θ represents the Bragg angle, of the peak having the highest intensity in an X-ray diffraction using CuKα as a radiation source, said 2θ falling within a range of between 43.6° and 44.1°, i.e., 43.6°≦2θ≦44.1°.

16. A nonaqueous electrolyte battery, comprising:
a positive electrode;
a negative electrode containing a negative electrode active material capable of absorbing-desorbing an alkali metal; and
a nonaqueous electrolyte;
wherein said negative electrode active material contains a compound having a composition represented by formula (4):

$$A_zFe_{(1-x)}M_xS_y \qquad (4)$$

where "A" contains at least one kind of an alkali metal, "M" contains at least one element selected from the group consisting of Cu, Ni, Co, Mn, Mg, Al, Si and Cr, the molar amount x falls within a range of between 0.0003 and 0.03, i.e., 0.0003≦x≦0.03, the molar amount y falls within a range of between 1.08 and 1.33, i.e., 1.08≦y≦1.33, and the molar amount z is not higher than 2, i.e., 0≦z≦2.

17. The nonaqueous electrolyte battery according to claim 16, wherein the nonaqueous electrolyte contains a nonaqueous solvent and a solute dissolved into the nonaqueous solvent, the nonaqueous solvent contains a first solvent containing at least one cyclic carbonate selected from the group consisting of ethylene carbonate, propylene carbonate and vinylene carbonate, and a second solvent containing at least one chain carbonate selected from the group consisting of diethyl carbonate, ethyl methyl carbonate and dimethyl carbonate, a content of the first solvent in the nonaqueous solvent is 4.8% or higher and 29% or lower by volume, and a content of the second solvent in the nonaqueous solvent is 71% or higher and 95.2% or lower by volume.

18. The nonaqueous electrolyte battery according to claim 17, wherein the nonaqueous solvent further contains at least one type of solvent selected from the group consisting of γ-butyrolactone, acetonitrile, methyl propionate, ethyl propionate, cyclic ether and chain ether, and a content of said at least one type of solvent in the nonaqueous solvent is 5% by volume or less.

19. The nonaqueous electrolyte battery according to claim 17, wherein the solute contains at least one type selected from the group consisting of $LiPF_6$, $LiBF_4$, $LiAsF_6$, $LiClO_4$, $LiCF_3SO_3$ and $LiN(Q_1SO_2)(Q_2SO_2)$ where $Q_1$ is $C_mF_{2m+1}$ (m=1, 2, 3, 4) and $Q_2$ is $C_nF_{2n+1}$ (n=1, 2, 3, 4).

20. The nonaqueous electrolyte battery according to claim 16, wherein x and y satisfy the following relationships: 0.001≦x≦0.01 and 1.09≦y≦1.2, respectively.

21. The nonaqueous electrolyte battery according to claim 16, wherein the nonaqueous electrolyte contains a nonaqueous solvent and a solute, the nonaqueous solvent contains a first solvent containing a cyclic carbonate and a second solvent containing a chain carbonate, and a mixture ratio of the first solvent to the second solvent satisfies the following formula (1):

$$S_1:S_2=1:2.5 \text{ to } 1:20 \qquad (1)$$

where $S_1$ represents the mixing amount by volume of said first solvent, and $S_2$ represents the mixing amount by volume of said second solvent.

22. A nonaqueous electrolyte battery, comprising:
a positive electrode;
a negative electrode containing a negative electrode active material capable of absorbing-desorbing an alkali metal; and
a nonaqueous electrolyte;
wherein said negative electrode active material contains a sulfide containing P and at least one metal element selected from the group consisting of Fe, Ni, Co. Mn and Cu.

23. A nonaqueous electrolyte battery, comprising:
a positive electrode;
a negative electrode containing a negative electrode active material capable of absorbing-desorbing an alkali metal; and
a nonaqueous electrolyte;
wherein said negative electrode active material contains a compound having a composition represented by formula (5):

$$A_aM1P_bS_c \qquad (5)$$

where "A" includes at least one kind of an alkali metal element, "M1" includes at least one kind of an element selected from the group consisting of Fe, Ni, Co, Mn and Cu, the molar amount "a" falls within a range of between 0 and 12, i.e., 0≦a≦12, the molar amount "b" falls within a range of between 0.1 and 1.1, i.e., 0.1≦b≦1.1, and the molar amount "c" falls within a range of between 0.9 and 3.3, i.e., 0.9≦c≦3.3.

* * * * *